US012559595B2

(12) United States Patent
Szemjonov et al.

(10) Patent No.: US 12,559,595 B2
(45) Date of Patent: Feb. 24, 2026

(54) CURABLE RESIN COMPOSITIONS

(71) Applicant: ILLUMINA, INC., San Diego, CA (US)

(72) Inventors: Alexandra Szemjonov, Cambridge (GB); Phillippa K. Edge, Cambridge (GB); Alexandre Richez, Cambourne (GB)

(73) Assignee: Illumina, Inc., San Diego, CA (US)

( * ) Notice: Subject to any disclaimer, the term of this patent is extended or adjusted under 35 U.S.C. 154(b) by 642 days.

(21) Appl. No.: 17/934,394

(22) Filed: Sep. 22, 2022

(65) Prior Publication Data

US 2023/0102870 A1 Mar. 30, 2023

Related U.S. Application Data

(60) Provisional application No. 63/248,179, filed on Sep. 24, 2021.

(51) Int. Cl.
*C08G 77/445* (2006.01)

(52) U.S. Cl.
CPC .................................. *C08G 77/445* (2013.01)

(58) Field of Classification Search
CPC ..... C08G 77/445; G03F 7/0045; G03F 7/027; G03F 7/029; G03F 7/031; G03F 7/038; G03F 7/0755
See application file for complete search history.

(56) References Cited

U.S. PATENT DOCUMENTS 6,106,999 A 8/2000 Ogiso et al.
9,255,922 B2 2/2016 Ho et al.
2010/0255058 A1* 10/2010 Hossainy ................ A61P 41/00 424/78.22
2014/0205949 A1 7/2014 Hara et al.
2017/0335076 A1 11/2017 Hatakeyama et al.
(Continued)

FOREIGN PATENT DOCUMENTS

CN 109762299 A 5/2019
EP 1794655 B1 12/2011
(Continued)

OTHER PUBLICATIONS

Sherzer et al; Self-Initiation of the UV Photopolymerization of Brominated Acrylates (Year: 2008).*
(Continued)

*Primary Examiner* — Randy P Gulakowski
*Assistant Examiner* — Holley Grace Hester
(74) *Attorney, Agent, or Firm* — Dierker & Kavanaugh, P.C.

(57) ABSTRACT

Some of the resin compositions are ultraviolet light or thermally curable, while others are ultraviolet light curable. One example of the ultraviolet light or thermally curable resin composition consists of a predetermined mass ratio of a (meth)acrylate cyclosiloxane monomer and a non-siloxane (meth)acrylate based monomer ranging from about >0:<100 to about 80:20; from 0 mass % to about 10 mass %, based on a total solids content of the resin composition, of an initiator selected from the group consisting of an azo-initiator, an acetophenone, a phosphine oxide, a brominated aromatic acrylate, and a dithiocarbamate; a surface additive; and a solvent.

11 Claims, 9 Drawing Sheets

Specification includes a Sequence Listing.

(56) References Cited

U.S. PATENT DOCUMENTS

| | | | |
|---|---|---|---|
| 2017/0354971 | A1 | 12/2017 | Taniguchi |
| 2020/0024661 | A1 | 1/2020 | Merkel et al. |
| 2020/0025670 | A1 | 1/2020 | Merkel et al. |

FOREIGN PATENT DOCUMENTS

| | | | |
|---|---|---|---|
| EP | 2717097 | A1 | 4/2014 |
| EP | 3208322 | A1 | 8/2017 |
| JP | 2011189617 | A1 | 9/2011 |
| WO | 2021133735 | A1 | 7/2021 |

OTHER PUBLICATIONS

Pai et al., "A Photoresist with Low Fluorescence for Bioanalytical Applications", Anal Chem., 79(22); pp. 8774-8780, Nov. 15, 2007.

Daikos et al., "Peculiarities of the photoinitiator-free photopolymerization of pentabrominated and pentafluorinated aromatic acrylates and methacrylates", Phys. Chem. Chem. Phys., 2016,18, 32369-32377, Nov. 7, 2016.

* cited by examiner

SEQUENCE LISTING

```
Sequence total quantity: 8
SEQ ID NO: 1            moltype = DNA  length = 29
FEATURE                 Location/Qualifiers
source                  1..29
                        mol_type = other DNA
                        organism = synthetic construct
modified_base           23
                        mod_base = OTHER
                        note = uracil
SEQUENCE: 1
aatgatacgg cgaccaccga gatctacac                                   29

SEQ ID NO: 2            moltype = DNA  length = 24
FEATURE                 Location/Qualifiers
source                  1..24
                        mol_type = other DNA
                        organism = synthetic construct
modified_base           22
```

-continued

```
                         mod_base = OTHER
                         note = 8-oxoguanine
SEQUENCE: 2
caagcagaag acggcatacg anat                                            24

SEQ ID NO: 3             moltype = DNA  length = 24
FEATURE                  Location/Qualifiers
source                   1..24
                         mol_type = other DNA
                         organism = synthetic construct
modified_base            20
                         mod_base = OTHER
                         note = 8-oxoguanine
SEQUENCE: 3
caagcagaag acggcatacn agat                                            24

SEQ ID NO: 4             moltype = DNA  length = 29
FEATURE                  Location/Qualifiers
source                   1..29
                         mol_type = other DNA
                         organism = synthetic construct
modified_base            23
                         mod_base = OTHER
                         note = allyl-T
SEQUENCE: 4
aatgatacgg cgaccaccga ganctacac                                       29

SEQ ID NO: 5             moltype = DNA  length = 35
FEATURE                  Location/Qualifiers
source                   1..35
                         mol_type = other DNA
                         organism = synthetic construct
SEQUENCE: 5
gctggcacgt ccgaacgctt cgttaatccg ttgag                                35

SEQ ID NO: 6             moltype = DNA  length = 35
FEATURE                  Location/Qualifiers
source                   1..35
                         mol_type = other DNA
                         organism = synthetic construct
SEQUENCE: 6
cgtcgtctgc catggcgctt cggtggatat gaact                                35

SEQ ID NO: 7             moltype = DNA  length = 35
FEATURE                  Location/Qualifiers
source                   1..35
                         mol_type = other DNA
                         organism = synthetic construct
SEQUENCE: 7
acggccgcta atatcaacgc gtcgaatccg caact                                35

SEQ ID NO: 8             moltype = DNA  length = 34
FEATURE                  Location/Qualifiers
source                   1..34
                         mol_type = other DNA
                         organism = synthetic construct
SEQUENCE: 8
gccgcgttac gttagccgga ctattcgatg cagc                                 34
```

CURABLE RESIN COMPOSITIONS

CROSS REFERENCE TO RELATED APPLICATION

This application claims the benefit of U.S. Provisional Application Ser. No. 63/248,179, filed Sep. 24, 2021, the contents of which is incorporated by reference herein in its entirety.

REFERENCE TO SEQUENCE LISTING

The Sequence Listing submitted herewith is hereby incorporated by reference in its entirety. The name of the file is ILI222B_IP-2196-US_Sequence_Listing_ST26.xml, the size of the file is 10,092 bytes, and the date of creation of the file is Sep. 7, 2022.

BACKGROUND

Nanoimprinting technology enables the economic and effective production of nanostructures. Nanoimprint lithography employs direct mechanical deformation of material by a stamp having nanostructures. The material is cured while the stamp is in place to lock the shape of the nanostructures in the material.

Nanoimprint lithography has been used to manufacture patterned substrates, which may be used in a variety of applications. Some patterned substrates include fluidic channels and discrete depressions. These patterned substrates may be built into flow cells. In some flow cells, active surface chemistry is introduced into the discrete depressions, while interstitial regions surrounding the discrete depressions remain inert. These flow cells may be particularly useful for detection and evaluation of a wide range of molecules (e.g., DNA), families of molecules, genetic expression levels, or single nucleotide polymorphisms.

SUMMARY

Disclosed herein are several resin compositions, which are suitable for use in nanoimprint lithography. The cured resins generated with examples of the resin composition may exhibit no or low autofluorescence at fluorescent detection wavelengths of interest when exposed to violet or blue excitation wavelengths ranging from about 375 nm to about 500 nm. With no or low autofluorescence, the cured resins do not contribute, or contribute minimally, to background fluorescence. A reduction in the background intensity increases the signal to noise ratio (SNR), which enables signals at the fluorescent detection wavelengths to be readily resolved. Thus, the cured resin compositions, and the resulting cured resins, may be particularly suitable for use in a variety of fluorescent-based bioanalytical applications, such as DNA sequencing, detection of immobilized proteins, cells or enzyme-binding molecules, drug screening, toxicity testing, etc.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 1A illustrates a substrate, FIG. 1B illustrates nanoimprinting of a resin composition deposited on the substrate of FIG. 1A, FIG. 1C illustrates a cured, patterned resin formed from the nanoimprinting illustrated in FIG. 1B, FIG. 1D illustrates a polymeric hydrogel deposited in depressions of the cured, patterned resin of FIG. 1C, and FIG. 1E illustrates primers grafted to the polymeric hydrogel in the depressions of the cured, patterned resin of FIG. 1D;

DETAILED DESCRIPTION

Figures 1A, 1B, 1C, 1D, 1E, 2:
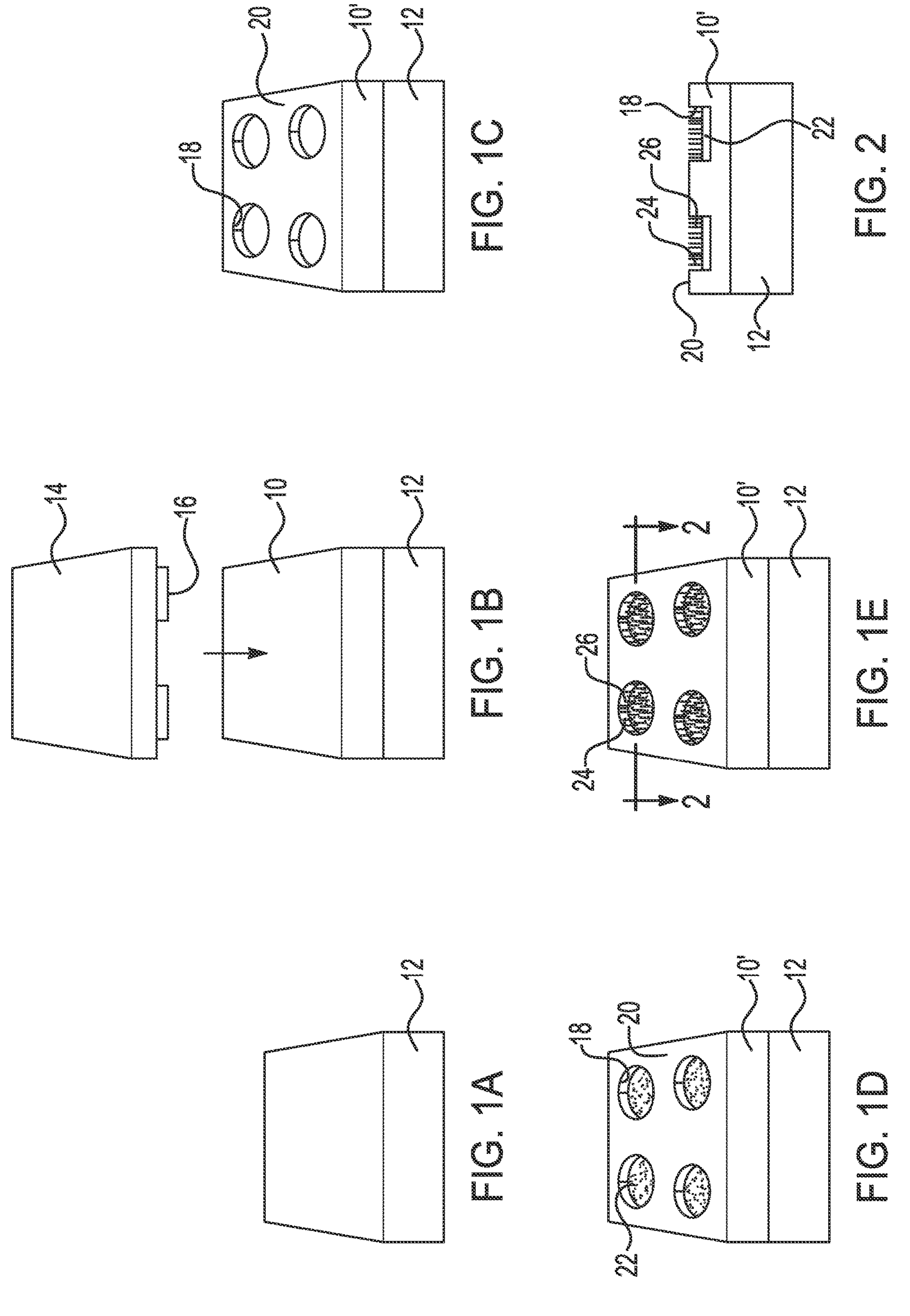
FIG. 1A through 1E are schematic perspective views which together depict an example of a method, where
FIG. 2 is a schematic, cross-sectional view taken along line 2-2 of the flow cell surface of FIG. 1E.

Some patterned biomedical systems, such as flow cells, include a cured resin composition that has discrete depressions (or wells) or trenches formed therein. To form the depressions or trenches, the resin composition (pre-curing) may be imprinted using a variety of techniques, such as nanoimprint lithography (NIL).

With nanoimprint lithography, the resin composition (including polymerizable multi-functional monomers) is deposited on a substrate. The deposited resin composition is patterned with an imprinting apparatus (e.g., a working stamp or template), which is pressed onto the resin surface. The resin composition deforms to fill the imprinting apparatus pattern. While the imprinting apparatus is still in contact with the resin composition, polymerization of the resin composition is initiated by exposure to light or heat, and the resin is cured. After the resin composition is sufficiently crosslinked such that it is no longer able to flow, the imprinting apparatus is peeled away from the surface, leaving behind an imprinted resin surface. When nanoimprinting is successful, features of the imprinting apparatus are transferred to the cured resin. The features (e.g., depressions or trenches) can then be functionalized with surface chemistry that enables fluorescent-based sequencing, analyte detection, etc.

When the features have a low pitch (i.e., the spacing from the center of one feature to the center of a directly adjacent feature (center-to-center spacing) or from the right edge or left edge of one feature to, respectively, the right edge or left edge of a directly adjacent feature (edge-to-edge spacing) is less than 500 nm), violet or blue imaging is used to achieve a desirable signal resolution. As examples, violet wavelength illumination may be particularly desirable for features with a pitch ranging from about 250 nm to about 350 nm; and blue wavelength illumination may be particularly desirable for features with a pitch ranging from about 300 nm to about 500 nm. The wavelengths of violet and blue light range from about 375 nm to 500 nm, which are very close to the emission of many ultraviolet (UV) light sources (e.g., 365 nm). The emission spectra of molecules are mirror images of their absorption spectra, shifted to higher wavelengths typically by tens of nanometers (Stokes-shift). Thus, many initiators that absorb at curing wavelengths (e.g., UV) and decompose to generate a reactive species, also generate by-products that emit when exposed to violet and/or blue light. These by-products can cause the cured resins to exhibit undesirable levels of autofluorescence at excitation wavelengths of interest (e.g., violet excitation wavelengths ranging from about 375 nm to about 450 nm, or blue excitation wavelengths ranging from about 450 nm to about 500 nm).

Fluorescence from the cured resin can increase the background noise, for example, when imaging during a fluorescent-based bioanalytical application (e.g., when imaging optical labels of nucleotides that have been incorporated into individual nascent strands formed in the features during sequencing). Increased background noise can decrease signal to noise ratios (SNRs) so that signals within individual features are more difficult to be resolved.

Examples of the resin composition disclosed herein exhibit low or no autofluorescence when exposed to violet or blue excitation wavelengths ranging from about 375 nm to about 500 nm.

Some examples of the resin composition include a mixture of a (meth)acrylate cyclosiloxane monomer and a non-siloxane (meth)acrylate based monomer without any photoinitiator. These examples polymerize upon exposure to light or heat without an initiator. Without the initiator, there are no initiator decomposition by-products that can lead to autofluorescence.

Other examples of the resin composition include a mixture of a (meth)acrylate cyclosiloxane monomer and a non-siloxane (meth)acrylate based monomer with an azo-initiator, a acetophenone initiator, a phosphine oxide initiator, a brominated aromatic acrylate initiator, and a dithiocarbamate initiator. Each of these initiators has been found to boost the curing rate of these examples of the resin composition without also increasing autofluorescence.

Still other examples of the resin composition include a mixture of two different epoxy cyclosiloxane monomers (each having a 1:1 ratio of Si:O in the cyclosiloxane), bis-(4-methylphenyl)iodonium hexafluorophosphate as a first initiator, and a second initiator selected from the group consisting of a free radical initiator and a cationic initiator other than bis-(4-methylphenyl)iodonium hexafluorophosphate. This combination of initiators has also been found to boost the curing rate of these examples of the resin composition without also increasing autofluorescence.

As mentioned herein, the examples of the cured resin composition exhibit very low or no autofluorescence when exposed to violet and blue excitation wavelengths. As used herein, violet excitation wavelengths include from about 375 nm to about 450 nm, and blue excitation wavelengths include from about 450 nm to about 500 nm. In another example, the violet excitation wavelengths range from about 375 nm to about 415 nm and the blue excitation wavelengths range from about 450 nm to about 465 nm. The examples of the cured resin composition may also have minimal violet and blue emissions. Also as used herein, violet emission wavelengths include from about 415 nm to about 455, and blue emission wavelengths include from about 480 nm to about 525 nm.

In some instances, the cured resin composition is described as having no fluorescence (emission of light) when exposed to violet excitation wavelengths and/or blue excitation wavelengths. No fluorescence or no autofluorescence means that the level of fluorescence is below a threshold limit of detection. In other instances, the cured resin composition fluoresces (emits light) when exposed to violet excitation wavelengths and/or blue excitation wavelengths. In these instances, the term "low autofluorescence" may mean that the emission level (of the cured resin when exposed to violet excitation wavelengths and/or blue excitation wavelengths) is above the threshold limit of detection, but is low enough to be considered noise, and the noise does not interfere with the identification of signals of interest. In one example, the autofluorescence levels enable signal to noise ratios (SNRs) that are high enough so that signals from individual clusters can be resolved during sequencing.

It is to be understood that the definition of "low" or "low level", in terms of quantifying the autofluorescence (AF), may vary depending upon the tool used to measure the autofluorescence and/or lamps used to provide the excitation radiation. In the examples set forth herein, one or more reference points are used to define the relative AF level. As one example, the references are the AF level of 0.7 mm thick CORNING® EAGLE XG® glass (CEXG) and the AF level of an epoxy polyhedral oligomeric silsesquioxane resin, and a "low AF" can be defined relative to the CEXG output and the epoxy resin output with violet or blue laser excitation.

The resin may have low AF if its autofluorescence is less than one half of the difference between the CEXG output and the epoxy resin output. The numerical values of the output (in arbitrary units) is relevant in a relative sense, as it may depend on the material being measured, the excitation and emission bands being measured, the intensity of exciting light, etc.

The examples of the resin composition disclosed herein also exhibit a desirable extent of cure (e.g., level of polymerization and/or crosslinking) of the monomers or polymers in the resin composition when exposed to relative short curing times (e.g., 60 seconds or less, such as 30 seconds, 20 seconds, etc.). Resins that are under-cured are not fully vitrified and can exhibit reflow, which may manifest in a poor and uncontrolled depression shape in the patterned area. Additionally, under-cured resins may have low hardness values, which can increase the material's sensitivity to downstream processing. Fourier-transform infrared spectroscopy (FTIR) intensity at 1636 $cm^{-1}$ ($CH_2{=}CH{-}R$ stretching) and 1406 $cm^{-1}$ ($C{=}C{-}H$ in-plane deformation) may be used to monitor the extent of cure for the (meth)acrylate resin compositions disclosed herein. Fourier-transform infrared spectroscopy (FTIR) intensity at 2991 $cm^{-1}$ may be used to monitor the extent of cure for the epoxy resin compositions disclosed herein. For example, the normalized intensity at 2991 $cm^{-1}$ may be monitored with respect to a reference peak intensity at 2925 $cm^{-1}$. A higher extent of cure corresponds with a lower intensity or corrected intensity at the given peaks.

Definitions

It is to be understood that terms used herein will take on their ordinary meaning in the relevant art unless specified otherwise. In addition to the terms "no autofluorescence" and "low autofluorescence" set forth above, several other terms are used herein. The meanings of these additional terms are set forth below.

The singular forms "a", "an", and "the" include plural referents unless the context clearly dictates otherwise.

The terms comprising, including, containing and various forms of these terms are synonymous with each other and are meant to be equally broad.

The terms top, bottom, lower, upper, on, adjacent, etc. are used herein to describe the flow cell and/or the various components of the flow cell. It is to be understood that these directional terms are not meant to imply a specific orientation, but are used to designate relative orientation between components. The use of directional terms should not be interpreted to limit the examples disclosed herein to any specific orientation(s).

The terms first, second, etc. also are not meant to imply a specific orientation or order, but rather are used to distinguish one component from another.

It is to be understood that the ranges provided herein include the stated range and any value or sub-range within the stated range, as if such values or sub-ranges were explicitly recited. For example, a range of about 400 nm to about 1 μm (1000 nm), should be interpreted to include not only the explicitly recited limits of about 400 nm to about 1 μm, but also to include individual values, such as about 708 nm, about 945.5 nm, etc., and sub-ranges, such as from about 425 nm to about 825 nm, from about 550 nm to about 940 nm, etc. Furthermore, when "about" and/or "substantially" are/is utilized to describe a value, they are meant to encompass minor variations (up to +/−10%) from the stated value.

An "acrylamide" is a functional group with the structure

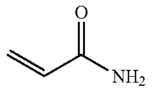

where each H may alternatively be an alkyl, an alkylamino, an alkylamido, an alkylthio, an aryl, a glycol, and optionally substituted variants thereof. Examples of monomers including an acrylamide functional group include azido acetamido pentyl acrylamide:

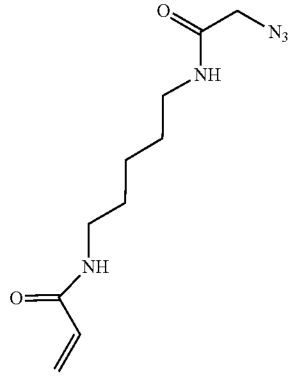 [SMILES: C=CC(=O)NCCCCCNC(=O)CN=[N+]=[N-]]

and N-isopropylacrylamide:

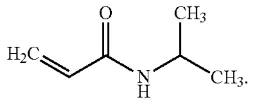

Other acrylamide monomers may be used, some examples of which are set forth herein.

As used herein the term "acrylate" refers to a "$CH_2{=}CHCOO{-}$" functional group (i.e.,

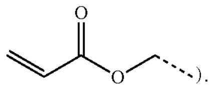
).

Acrylates include substituted variations thereof (e.g., methacrylate is an example of an acrylate).

An "aldehyde," as used herein, is an organic compound containing a functional group with the structure —CHO, which includes a carbonyl center (i.e., a carbon double-bonded to oxygen) with the carbon atom also bonded to hydrogen and an R group, such as an alkyl or other side chain. The general structure of an aldehyde is:

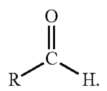

As used herein, "alkyl" refers to a straight or branched hydrocarbon chain that is fully saturated (i.e., contains no double or triple bonds). The alkyl group may have 1 to 20 carbon atoms. Example alkyl groups include methyl, ethyl, propyl, isopropyl, butyl, isobutyl, tertiary butyl, pentyl, hexyl, and the like. As an example, the designation "C1-C4 alkyl" indicates that there are one to four carbon atoms in the alkyl chain, i.e., the alkyl chain is selected from the group consisting of methyl, ethyl, propyl, iso-propyl, n-butyl, isobutyl, sec-butyl, and t-butyl. An alkyl may be substituted or unsubstituted. An example of a substituted alkyl is a haloalkyl, or an alkyl substituted with a halogen.

As used herein, "alkylamino" refers to an alkyl group in which one or more of the hydrogen atoms are replaced by an amino group, where the amino group refers to an —$NR_aR_b$ group, where $R_a$ and $R_b$ are each independently selected from a C1-C6 alkyl, C2-C6 alkenyl, C2-C6 alkynyl, C3-C7 carbocycle, C6-C10 aryl, a 5-10 membered heteroaryl, and a 5-10 membered heterocycle.

As used herein, "alkylamido" refers to an alkyl group in which one or more of the hydrogen atoms are replaced by a C-amido group or an N-amido group. A "C-amido" group refers to a "—C(═O)N($R_aR_b$)" group in which $R_a$ and $R_b$ can independently be selected from the group consisting of alkyl, alkenyl, alkynyl, cycloalkyl, cycloalkenyl, cycloalkynyl, aryl, heteroaryl, heteroalicycle, aralkyl, or (heteroalicyclic)alkyl. An "N-amido" group refers to a "RC(═O)N($R_a$)—" group in which R and $R_a$ can independently be selected from the group consisting of alkyl, alkenyl, alkynyl, cycloalkyl, cycloalkenyl, cycloalkynyl, aryl, heteroaryl, heteroalicycle, aralkyl, or (heteroalicyclic)alkyl. Any alkylamido may be substituted or unsubstituted.

As used herein, "alkylthio" refers to RS—, in which R is an alkyl. The alkylthio can be substituted or unsubstituted.

As used herein, "alkene" or "alkenyl" refers to a straight or branched hydrocarbon chain containing one or more double bonds. The alkenyl group may have 2 to 20 carbon atoms. Example alkenyl groups include ethenyl, propenyl, butenyl, pentenyl, hexenyl, and the like.

As used herein, "alkyne" or "alkynyl" refers to a straight or branched hydrocarbon chain containing one or more triple bonds. The alkynyl group may have 2 to 20 carbon atoms.

An "amine" or "amino" functional group refers to an —$NR_aR_b$ group, where $R_a$ and $R_b$ are each independently selected from hydrogen (e.g.,

),

C1-C6 alkyl, C2-C6 alkenyl, C2-C6 alkynyl, C3-C7 carbocycle, C6-C10 aryl, 5-10 membered heteroaryl, and 5-10 membered heterocycle, as defined herein.

As used herein, "aralkyl" and "aryl(alkyl)" refer to an aryl group connected, as a substituent, via a lower alkylene group. The lower alkylene and aryl group of an aralkyl may be substituted or unsubstituted. Examples include but are not limited to benzyl, 2-phenylalkyl, 3-phenylalkyl, and naphthylalkyl.

The term "aryl" refers to an aromatic ring or ring system (i.e., two or more fused rings that share two adjacent carbon atoms) containing only carbon in the ring backbone. When the aryl is a ring system, every ring in the system is aromatic. The aryl group may have 6 to 18 carbon atoms. Examples of aryl groups include phenyl, naphthyl, azulenyl, and anthracenyl. Any aryl may be a heteroaryl, with at least one heteroatom, that is, an element other than carbon (e.g., nitrogen, oxygen, sulfur, etc.), in ring backbone.

As used herein, the term "attached" refers to the state of two things being joined, fastened, adhered, connected or bound to each other, either directly or indirectly. For example, a nucleic acid can be attached to a polymer hydrogel by a covalent or non-covalent bond. A covalent bond is characterized by the sharing of pairs of electrons between atoms. A non-covalent bond is a physical bond that does not involve the sharing of pairs of electrons and can include, for example, hydrogen bonds, ionic bonds, van der Waals forces, hydrophilic interactions and hydrophobic interactions.

An "azide" or "azido" functional group refers to —$N_3$.

As used herein, "carbocycle" means a non-aromatic cyclic ring or ring system containing only carbon atoms in the ring system backbone. When the carbocycle is a ring system, two or more rings may be joined together in a fused, bridged or spiro-connected fashion. Carbocycles may have any degree of saturation, provided that at least one ring in a ring system is not aromatic. Thus, carbocycles include cycloalkyls, cycloalkenyls, and cycloalkynyls. The carbocycle group may have 3 to 20 carbon atoms. Examples of carbocycle rings include cyclopropyl, cyclobutyl, cyclopentyl, cyclohexyl, cyclohexenyl, 2,3-dihydro-indene, bicyclo [2.2.2]octanyl, adamantyl, and spiro[4.4]nonanyl. Any of the carbocycles may be heterocycles, with at least one heteroatom in ring backbone.

As used herein, "cycloalkyl" refers to a completely saturated (no double or triple bonds) mono- or multi-cyclic hydrocarbon ring system. When composed of two or more rings, the rings may be joined together in a fused fashion. Cycloalkyl groups can contain 3 to 10 atoms in the ring(s). In some examples, cycloalkyl groups can contain 3 to 8 atoms in the ring(s). A cycloalkyl group may be unsubstituted or substituted. Example cycloalkyl groups include cyclopropyl, cyclobutyl, cyclopentyl, cyclohexyl, cycloheptyl, and cyclooctyl.

As used herein, "cycloalkenyl" or "cycloalkene" means a carbocycle ring or ring system having at least one double bond, wherein no ring in the ring system is aromatic. Examples include cyclohexenyl or cyclohexene and norbornenyl or norbornene.

As used herein, "cycloalkynyl" or "cycloalkyne" means a carbocycle ring or ring system having at least one triple bond, wherein no ring in the ring system is aromatic. An example is cyclooctyne. Another example is bicyclononyne. Still another example is dibenzocyclooctyne (DBCO).

The term "depositing," as used herein, refers to any suitable application technique, which may be manual or automated, and, in some instances, results in modification of the surface properties. Depositing may be performed using vapor deposition techniques, coating techniques, grafting techniques, or the like. Some specific examples include chemical vapor deposition (CVD), spray coating (e.g., ultrasonic spray coating), spin coating, dunk or dip coating, doctor blade coating, puddle dispensing, flow through coating, aerosol printing, screen printing, microcontact printing, inkjet printing, or the like.

As used herein, the term "depression" refers to a discrete concave feature in a patterned resin having a surface opening that is at least partially surrounded by interstitial region(s) of the cured resin. Depressions can have any of a variety of shapes at their opening in a surface including, as examples, round, elliptical, square, polygonal, star shaped (with any number of vertices), etc. The cross-section of a depression taken orthogonally with the surface can be curved, square, polygonal, hyperbolic, conical, angular, etc. The depression may also have more complex architectures, such as ridges, step features, etc. Depressions are one example of the features that can be formed using nanoimprint lithography. Another example of such a feature is a trench/trough.

The term "each," when used in reference to a collection of items, is intended to identify an individual item in the collection, but does not necessarily refer to every item in the collection. Exceptions can occur if explicit disclosure or context clearly dictates otherwise.

The term "epoxy" as used herein refers to

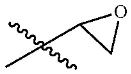 or 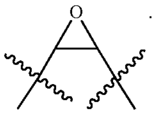 .

The term "epoxy cyclosiloxane monomer having a 1:1 ratio of Si:O in the cyclosiloxane" refers to 3 or more repeating units of silicon and oxygen in a closed loop or ring, where the ring is functionalized with an epoxy-containing functional group.

"FilterArea" is the integrated fluorescence intensity (AU) using a selected collection band (collection filter), whereby the wavelengths are chosen to match the sequencing imaging wavelengths (Violet: 418-550 nm, Blue: 482-525 nm, Green: 575-625 nm).

As used herein, the term "flow cell" is intended to mean a vessel having a flow channel where a reaction can be carried out, an inlet for delivering reagent(s) to the flow channel, and an outlet for removing reagent(s) from the flow channel. In some examples, the flow cell enables the detection of the reaction that occurs in the flow channel. For example, the flow cell may include one or more transparent surfaces allowing for the optical detection of arrays, optically labeled molecules, or the like within the flow channel.

As used herein, a "flow channel" or "channel" may be an area defined between two bonded components, which can selectively receive a liquid sample. In examples disclosed herein, the flow channel may be defined between a patterned substrate and a lid, and thus may be in fluid communication with one or more depressions defined in the patterned substrate or resin. The flow channel may also be defined between two patterned substrate surfaces that are bonded together.

As used herein, "heteroalicyclic" or "heteroalicycle" refers to three-, four-, five-, six-, seven-, eight-, nine-, ten-, up to 18-membered monocyclic, bicyclic, and tricyclic ring system wherein carbon atoms together with from 1 to 5 heteroatoms constitute said ring system. A heteroalicyclic ring system may optionally contain one or more unsaturated bonds situated in such a way, however, that a fully delocalized pi-electron system does not occur throughout all the rings. The heteroatoms are independently selected from oxygen, sulfur, and nitrogen. A heteroalicyclic ring system may further contain one or more carbonyl or thiocarbonyl functionalities, so as to make the definition include oxo-systems and thio-systems such as lactams, lactones, cyclic imides, cyclic thioimides, and cyclic carbamates. The rings may be joined together in a fused fashion. Additionally, any nitrogens in a heteroalicyclic may be quaternized. Heteroalicycle or heteroalicyclic groups may be unsubstituted or substituted. Examples of such "heteroalicyclic" or "heteroalicycle" groups include 1,3-dioxin, 1,3-dioxane, 1,4-dioxane, 1,2-dioxolane, 1,3-dioxolane, 1,4-dioxolane, 1,3-oxathiane, 1,4-oxathiin, 1,3-oxathiolane, 1,3-dithiole, 1,3-dithiolane, 1,4-oxathiane, tetrahydro-1,4-thiazine, 2H-1,2-oxazine, maleimide, succinimide, barbituric acid, thiobarbituric acid, dioxopiperazine, hydantoin, dihydrouracil, trioxane, hexahydro-1,3,5-triazine, imidazoline, imidazolidine, isoxazoline, isoxazolidine, oxazoline, oxazolidine, oxazolidinone, thiazoline, thiazolidine, morpholine, oxirane, piperidine N-oxide, piperidine, piperazine, pyrrolidine, pyrrolidone, pyrrolidione, 4-piperidone, pyrazoline, pyrazolidine, 2-oxopyrrolidine, tetrahydropyran, 4H-pyran, tetrahydrothiopyran, thiamorpholine, thiamorpholine sulfoxide, thiamorpholine sulfone, and their benzo-fused analogs (e.g., benzimidazolidinone, tetrahydroquinoline, 3,4-methylenedioxyphenyl).

A "(heteroalicyclic)alkyl" refers to a heterocyclic or a heteroalicyclic group connected, as a substituent, via a lower alkylene group. The lower alkylene and heterocycle or a heterocycle of a (heteroalicyclic)alkyl may be substituted or unsubstituted. Examples include but are not limited tetrahydro-2H-pyran-4-yl)methyl, (piperidin-4-yl)ethyl, (piperidin-4-yl)propyl, (tetrahydro-2H-thiopyran-4-yl)methyl, and (1,3-thiazinan-4-yl)methyl.

As used herein, "heteroaryl" refers to an aromatic ring or ring system (i.e., two or more fused rings that share two adjacent atoms) that contain(s) one or more heteroatoms, that is, an element other than carbon, including but not limited to, nitrogen (N), oxygen (O) and sulfur (S), in the ring backbone. When the heteroaryl is a ring system, every ring in the system is aromatic. The heteroaryl group may have 5-18 ring members.

As used herein, "heterocycle" means a non-aromatic cyclic ring or ring system containing at least one heteroatom in the ring backbone. Heterocycles may be joined together in a fused, bridged or spiro-connected fashion. Heterocycles may have any degree of saturation provided that at least one ring in the ring system is not aromatic. In the ring system, the heteroatom(s) may be present in either a non-aromatic or aromatic ring. The heterocycle group may have 3 to 20 ring members (i.e., the number of atoms making up the ring backbone, including carbon atoms and heteroatoms). In some examples, the heteroatom(s) are O, N, or S.

The term "hydrazine" or "hydrazinyl" as used herein refers to a —$NHNH_2$ group.

As used herein, the term "hydrazone" or "hydrazonyl" as used herein refers to a

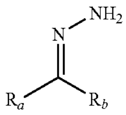

group in which $R_a$ and $R_b$ are each independently selected from hydrogen, C1-6 alkyl, C2-6 alkenyl, C2-6 alkynyl, C3-7 carbocyclyl, C6-10 aryl, 5-10 membered heteroaryl, and 5-10 membered heterocyclyl, as defined herein.

As used herein, "hydroxy" or "hydroxyl" refers to an —OH group.

As used herein, an "initiator" is a molecule that undergoes a reaction upon absorption of radiation or heat or upon exposure to free radicals, thereby producing a reactive species. Initiators are capable of initiating or catalyzing chemical reactions that result in changes in the solubility and/or physical properties of formulations. A "cationic initiator" or "photoacid generator" (PAG) is a molecule that becomes acidic upon exposure to radiation or to free radicals. PAGs generally undergo proton photodissociation irreversibly. A "free radical initiator" is a molecule that generates a radical species upon exposure to radiation or heat and that promotes radical reactions.

As used herein, the term "interstitial region" refers to an area on a surface (e.g., of a cured patterned resin) that separates depressions or other features. For example, an interstitial region can separate one feature of an array from another feature of the array. The two features that are separated from each other can be discrete, i.e., lacking physical contact with each other. In another example, an interstitial region can separate a first portion of a feature from a second portion of a feature. In many examples, the interstitial region is continuous whereas the features are discrete, for example, as is the case for a plurality of depressions defined in an otherwise continuous surface. In other examples, the interstitial regions and the features are discrete, for example, as is the case for a plurality of trenches separated by respective interstitial regions. The separation provided by an interstitial region can be partial or full separation. Interstitial regions may have a surface material that differs from the surface material of the features. For example, features of an array can have an amount or concentration of a polymeric hydrogel and primer(s) that exceeds the amount or concentration present at the interstitial regions. In some examples, the polymeric hydrogel and primer(s) may be present in depressions or trenches and may not be present at the interstitial regions.

The term "(meth)" indicates that the acrylate, etc., may or may not include the methyl group.

A "(meth)acrylate cyclosiloxane monomer" includes 3 or more repeating units of silicon and oxygen in a closed loop or ring, where the ring is functionalized with a (meth) acrylate-containing functional group.

"Nitrile oxide," as used herein, means a "$R_aC{\equiv}N^+O^-$" group in which $R_a$ is defined herein. Examples of preparing nitrile oxide include in situ generation from aldoximes by treatment with chloramide-T or through action of base on imidoyl chlorides [RC(Cl)=NOH] or from the reaction between hydroxylamine and an aldehyde.

"Nitrone," as used herein, means a

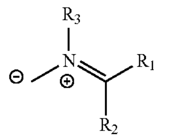

group in which $R_1$, $R_2$, and $R_3$ may be any of the $R_a$ and $R_b$ groups defined herein.

A "non-siloxane (meth)acrylate based monomer" is a polymerizable acrylate or methacrylate that does not include any repeating units of silicon and oxygen.

As used herein, a "nucleotide" includes a nitrogen containing heterocyclic base, a sugar, and one or more phosphate groups. Nucleotides are monomeric units of a nucleic acid sequence. In RNA (ribonucleic acid), the sugar is a ribose, and in DNA (deoxyribonucleic acid), the sugar is a deoxyribose, i.e. a sugar lacking a hydroxyl group that is present at the 2' position in ribose. The nitrogen containing heterocyclic base (i.e., nucleobase) can be a purine base or a pyrimidine base. Purine bases include adenine (A) and guanine (G), and modified derivatives or analogs thereof. Pyrimidine bases include cytosine (C), thymine (T), and uracil (U), and modified derivatives or analogs thereof. The C-1 atom of deoxyribose is bonded to N-1 of a pyrimidine or N-9 of a purine. A nucleic acid analog may have any of the phosphate backbone, the sugar, or the nucleobase altered. Examples of nucleic acid analogs include, for example, universal bases or phosphate-sugar backbone analogs, such as peptide nucleic acid (PNA).

As used herein, the "primer" is defined as a single stranded nucleic acid sequence (e.g., single strand DNA). Some primers, which may be referred to as amplification primers, serve as a starting point for template amplification and cluster generation. Other primers, which may be referred to as sequencing primers, serve as a starting point for DNA synthesis. The 5' terminus of the primer may be modified to allow a coupling reaction with a functional group of the polymeric hydrogel. The primer length can be any number of bases long and can include a variety of non-natural nucleotides. In an example, the sequencing primer is a short strand, ranging from 10 to 60 bases, or from 20 to 40 bases.

The term "resin composition" refers to any of the monomer mixtures set forth herein. The resin composition may also include one or more initiators as defined herein, a surface additive, and a solvent.

A "spacer layer," as used herein refers to a material that bonds two components together. In some examples, the spacer layer can be a radiation-absorbing material that aids in bonding, or can be put into contact with a radiation-absorbing material that aids in bonding. The spacer layer may be present in a bonding region, e.g., an area on a substrate that is to be bonded to another material, which may be, as examples, a spacer layer, a lid, another substrate, etc., or combinations thereof (e.g., the spacer layer and a lid). The bond that is formed at the bonding region may be a chemical bond (as described above), or a mechanical bond (e.g., using a fastener, etc.).

A "thiol" functional group refers to —SH.

As used herein, the terms "tetrazine" and "tetrazinyl" refer to six-membered heteroaryl group comprising four nitrogen atoms. Tetrazine can be optionally substituted.

"Tetrazole," as used herein, refers to a five-membered heterocyclic group including four nitrogen atoms. Tetrazole can be optionally substituted.

The term "thermally curable" means that polymerization or polymerization and crosslinking of the resin composition is/are initiated by exposure to heat. The temperature for thermal curing will depend upon the monomers in the resin composition.

The term "ultraviolet light curable" means polymerization or polymerization and crosslinking of the resin composition is/are initiated by exposure to ultraviolet light, i.e., radiation with wavelengths ranging from about 280 nm to about 400 nm).

(Meth)Acrylate-Based Resin Compositions

Some of the examples disclosed herein are ultraviolet light and/or thermally curable (meth)acrylate-based resin compositions. In some examples, the ultraviolet light or thermally curable resin composition comprises or consists of a predetermined mass ratio of a (meth)acrylate cyclosiloxane monomer and a non-siloxane (meth)acrylate based monomer ranging from about >0:<100 to about 80:20; from 0 mass % to about 10 mass %, based on a total solids content of the resin composition, of an initiator (e.g., a free radical initiator) selected from the group consisting of an azo-initiator, an acetophenone, a phosphine oxide, a brominated aromatic acrylate, and a dithiocarbamate; a surface additive; and a solvent. When the resin composition consists of the listed components, it is to be understood that it does not include any other components.

In any of the (meth)acrylate-based resin compositions, the (meth)acrylate cyclosiloxane monomer is 2,4,6,8-tetramethyl-2,4,6,8-tetrakis[3-acryloyloxypropyl]cyclotetrasiloxane:

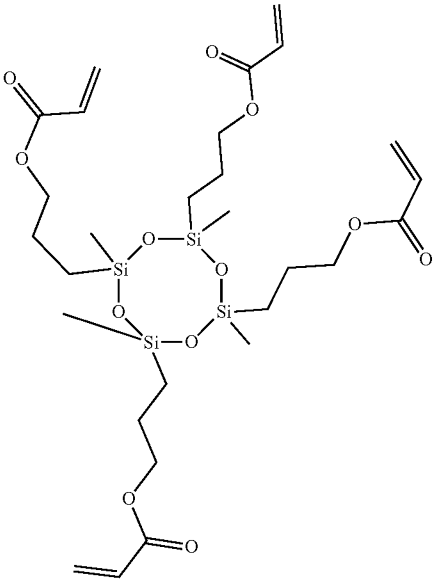 [SMILES: C=CC(=O)OCCC[Si]1(C)O[Si](C)(CCCOC(=O)C=C)O[Si](C)(CCCOC(=O)C=C)O[Si](C)(CCCOC(=O)C=C)O1]

and the non-siloxane (meth)acrylate based monomer is selected from the group consisting of glycerol dimethacrylate, mixture of isomers:

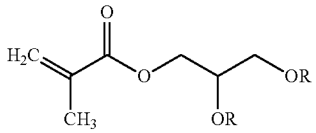

where R is H or

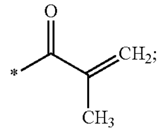 [SMILES: *C(=O)C(=C)C]

glycerol 1,3-diglycerolate diacrylate

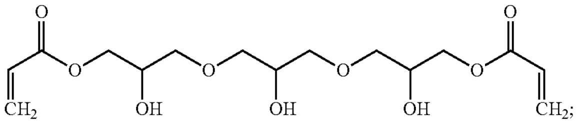 [SMILES: C=CC(=O)OCC(O)COCC(O)COCC(O)COC(=O)C=C]

pentaerythritol triacrylate:

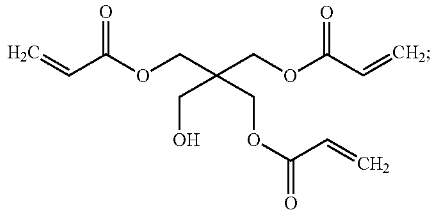 [SMILES: C=CC(=O)OCC(CO)(COC(=O)C=C)COC(=O)C=C]

pentaerythritol tetraacrylate:

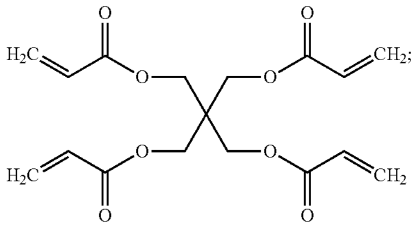 [SMILES: C=CC(=O)OCC(COC(=O)C=C)(COC(=O)C=C)COC(=O)C=C]

bisphenol A glycerolate diacrylate:

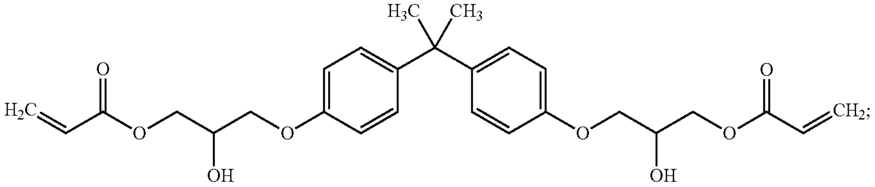 [SMILES: C=CC(=O)OCC(O)COc1ccc(C(C)(C)c2ccc(OCC(O)COC(=O)C=C)cc2)cc1]

trimethylpropane triacrylate:

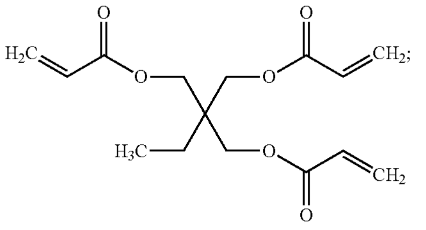 [SMILES: C=CC(=O)OCC(CC)(COC(=O)C=C)COC(=O)C=C]

3-(acryloyloxy)-2-hydroxypropyl methacrylate:

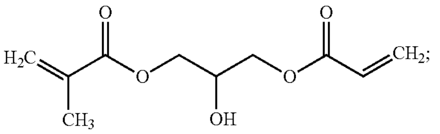

poly(ethylene glycol)dimethacrylate:

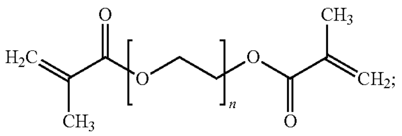

ethylene glycol dimethacrylate:

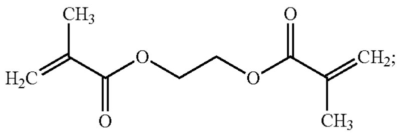

and combinations thereof.

In any of the (meth)acrylate-based resin compositions, the predetermined mass ratio of the (meth)acrylate cyclosiloxane monomer and the non-siloxane (meth)acrylate based monomer ranges from about greater than (>) 0: less than (<)100 to about 80:20 (4:1). In one example, the mass ratio of the (meth)acrylate cyclosiloxane monomer and the non-siloxane (meth)acrylate based monomer is 50:50 (1:1).

In any of the (meth)acrylate-based resin compositions, the total amount of the combination of (meth)acrylate monomers ranges from about 87 mass % to less than 100 mass %, based on the total solids in the resin composition. The total amount of the (meth)acrylate monomers depends upon the other solids, e.g., the surface additive and the initiator (if included), that are present in the resin composition. In one example, the (meth)acrylate monomers make up from about 93 mass % to about 98.5 mass % of the total solids in the resin composition.

The surface additive can adjust the surface tension of the (meth)acrylate-based resin compositions, which can improve the detachability of the resin from an imprinting apparatus (e.g., a working stamp), improve the coatability of the resin composition, promote thin film stability, and/or improve leveling. Examples of surface additives include polyacrylate polymers (such as BYK®-350 available from BYK). The amount of the surface additive may be 3 mass % or less, based on the total mass of the (meth)acrylate-based resin compositions.

Any example of the (meth)acrylate-based resin composition may also include a solvent. The solvent may be added to achieve a desired viscosity for the deposition technique being used to apply the resin composition. Examples of the resin composition viscosity (e.g., after the solvent is introduced) range from about 1.75 mPa to about 2.2 mPa (measured at 25° C.). The viscosity may be higher or lower if desired. Examples of suitable solvents include propylene glycol monomethyl ether acetate (PGMEA), toluene, dimethyl sulfoxide (DMSO), tetrahydrofuran (THF), etc. In some examples, the solvent is PGMEA. The total solids concentration of the (meth)acrylate-based resin composition may range from about 15 mass % to about 60 mass % (based on the total mass of the resin composition), and the amount of solvent may range from about 40 mass % to about 85 mass % (based on the mass of the resin composition). The upper limits of the total solids may be higher depending upon the respective solubility of the solid component(s) in the solvent that is selected.

The (meth)acrylate cyclosiloxane monomer and the non-siloxane (meth)acrylate based monomer polymerize upon exposure to UV light or heat without an initiator, and thus one example of the (meth)acrylate-based resin composition does not include an initiator. In this example, the ultraviolet light or thermally curable resin composition consists of the predetermined mass ratio of the (meth)acrylate cyclosiloxane monomer and a non-siloxane (meth)acrylate based monomer ranging from about >0:<100 to about 80:20; the surface additive; and the solvent. Any example and amounts of the surface additive and the solvent may be used in the initiator free example of the (meth)acrylate-based resin composition.

As mentioned, any example of the (meth)acrylate-based resin composition that is free of the initiator is ultraviolet light curable or thermally curable. In one example, a 365 nm UV light source may be used to cure this example of the resin composition. In another example, a broad spectrum light source (e.g., from about 270 nm to about 600 nm) may be used. In another example, heat ranging from about 130° C. to about 140° C. may be used to cure this example of the resin composition.

While the (meth)acrylate cyclosiloxane monomer and the non-siloxane (meth)acrylate based monomer polymerize upon exposure to UV light or heat without an initiator, one example of the (meth)acrylate-based resin composition includes an azo-initiator to reduce the cure time and enhance the extent of cure. The azo-initiators disclosed herein are thermal initiators. However, when exposed to light (e.g., from 340 nm to 380 nm UV light), the azo-initiators disclosed herein also decompose to generate free radicals, which can initiate polymerization of monomers containing (meth)acrylate chemistries. Thus, the azo-initiators disclosed herein can be used as photoinitiators. The generated radicals or by-products of the azo-initiator reactions have little or no autofluorescence when exposed to visible light (including violet and blue excitation wavelengths). Thus, the addition of the azo-initiator does not deleteriously increase the autofluorescence of the cured resin. As such, in one example, the resin composition includes the initiator; the initiator is the azo-initiator; and the azo-initiator is selected from the group consisting of azobisisobutyronitrile:

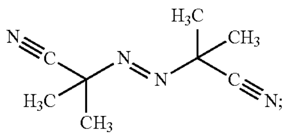

2,2'-azobis(2,4-dimethylvaleronitrile):

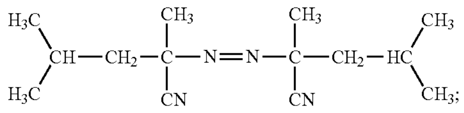

1,1'-azobis(cyclohexanecarbonitrile):

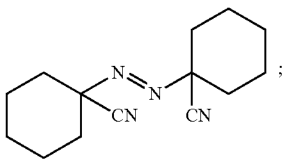 [SMILES: N#CC1(/N=N/C2(C#N)CCCCC2)CCCCC1]

2,2'-azobis(4-methoxy-2,4-dimethylvaleronitrile):

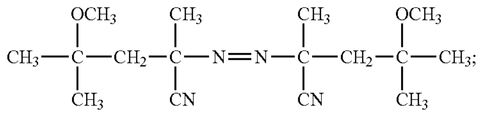

dimethyl 2,2'-azobis(2-methylpropionate):

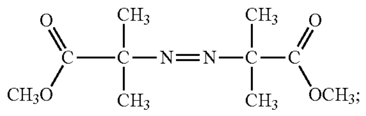

and 2,2'-Azobis(N-butyl-2-methylpropionamide:

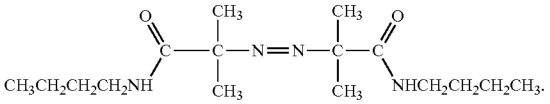

When the azo-initiator is used, it may be present in an amount ranging from greater than 0 mass % to about 6 mass %, based on the total solids of the resin composition. In one example, the azo-initiator is present in an amount ranging from about 2 mass % to about 5 mass %, based on the total solids of the resin composition.

The azo-initiator has been found to be successful in enhancing the curing rate and extent of cure without an additional photosensitizer. Thus, in one example, the (meth) acrylate-based, ultraviolet light or thermally curable resin composition comprises the predetermined mass ratio of the (meth)acrylate cyclosiloxane monomer and the non-siloxane (meth)acrylate based monomer ranging from about >0:<100 to about 80:20; from greater than 0 mass % to about 5 mass %, based on a total solids content of the resin composition, of the azo-initiator; the surface additive; and the solvent, wherein the resin composition is free of a photosensitizer. In this example, the azo-initiator is also selected from the group consisting of azobisisobutyronitrile; 2,2'-azobis(2,4-dimethylvaleronitrile); 1,1'-azobis(cyclohexanecarbonitrile); 2,2'-azobis(4-methoxy-2,4-dimethylvaleronitrile); dimethyl 2,2'-azobis(2-methylpropionate); and 2,2'-Azobis(N-butyl-2-methylpropionamide.

Any example of the (meth)acrylate-based resin composition that includes the azo-initiator also includes the surface additive and the solvent. Any example and amounts of the surface additive and the solvent may be used.

Any example of the (meth)acrylate-based resin composition that includes the azo-initiator is ultraviolet light curable or thermally curable. In one example, a 365 nm UV light source may be used to cure this example of the resin composition. In another example, a broad spectrum light source (e.g., from about 270 nm to about 600 nm) may be used. In another example, heat ranging from about 30° C. to about 140° C. may be used to cure this example of the resin composition.

While the (meth)acrylate cyclosiloxane monomer and the non-siloxane (meth)acrylate based monomer polymerize upon exposure to UV light without an initiator, examples of the (meth)acrylate-based resin composition may include an acetophenone initiator, a phosphine oxide initiator, a brominated aromatic acrylate initiator, and a dithiocarbamate initiator to significantly reduce the UV cure time and enhance the extent of UV cure. When exposed to UV light, the acetophenone initiator, the phosphine oxide initiator, the brominated aromatic acrylate initiator, and the dithiocarbamate initiator each decompose to generate free radicals (e.g., via α-cleavage), which can initiate polymerization of monomers containing (meth)acrylate chemistries. Thus, the acetophenone initiator, the phosphine oxide initiator, the brominated aromatic acrylate initiator, or the dithiocarbamate initiator can be used as photoinitiators. In some instances, the rapid curing rate of each of these initiators enables very few, if any, by-products to form. As such, very few, if any, components that can increase autofluorescence are introduced into the cured resin. In other instances, decomposition products/by-products that have low autofluorescence are formed. Thus, the addition of the acetophenone initiator, the phosphine oxide initiator, the brominated aromatic acrylate initiator, or the dithiocarbamate initiator does not deleteriously increase the autofluorescence of the cured resin.

In one example, the (meth)acrylate-based resin composition includes the initiator; the initiator is the acetophenone; and the acetophenone is selected from the group consisting of 2,2-dimethoxy-2-phenylacetophenone:

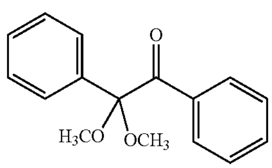 [SMILES: COC(OC)(C(=O)c1ccccc1)c1ccccc1]

and 2-hydroxy-2-methylpriophenone:

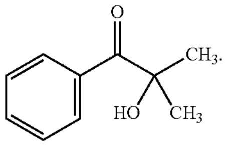

In another example, the (meth)acrylate-based resin composition includes the initiator; the initiator is the phosphine oxide; and the phosphine oxide is selected from the group consisting of diphenyl(2,4,6-trimethylbenzoyl)phosphine oxide:

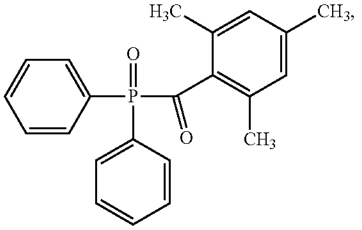 [SMILES: Cc1cc(C)c(C(=O)P(=O)(c2ccccc2)c2ccccc2)c(C)c1]

phenylbis(2,4,6-trimethylbenzoyl)phosphine oxide:

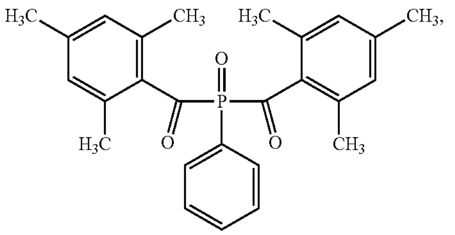 [SMILES: Cc1cc(C)c(C(=O)P(=O)(C(=O)c2c(C)cc(C)cc2C)c2ccccc2)c(C)c1]

diphenyl(2,4,6-trimethylbenzoyl)phosphine oxide:

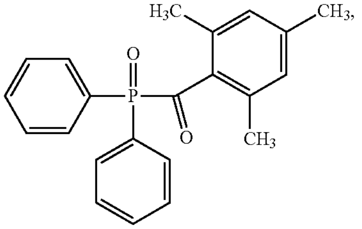 [SMILES: Cc1cc(C)c(C(=O)P(=O)(c2ccccc2)c2ccccc2)c(C)c1]

ethyl(2,4,6-trimethylbenzoyl)phenylphosphinate:

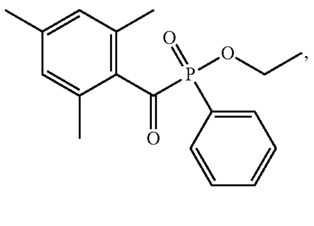 [SMILES: CCOP(=O)(C(=O)c1c(C)cc(C)cc1C)c1ccccc1]

and combinations thereof.

In still another example, the (meth)acrylate-based resin composition includes the initiator; the initiator is the brominated aromatic acrylate; and the brominated aromatic acrylate is pentabromobenzyl acrylate:

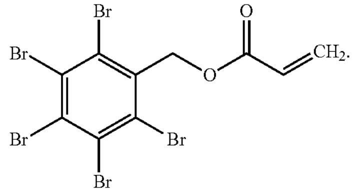 [SMILES: C=CC(=O)OCc1c(Br)c(Br)c(Br)c(Br)c1Br]

In yet a further example, the (meth)acrylate-based resin composition includes the initiator; the initiator is the dithiocarbamate; and the dithiocarbamate is benzyl diethyldithiocarbamate:

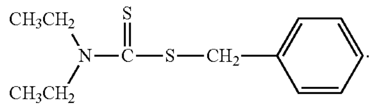

Thus, an example of the (meth)acrylate based, ultraviolet light curable resin composition comprises the predetermined mass ratio of the (meth)acrylate cyclosiloxane monomer and a non-siloxane (meth)acrylate based monomer ranging from about >0:<100 to about 80:20; the initiator selected from the group consisting of the acetophenone, the phosphine oxide, the brominated aromatic acrylate, and the dithiocarbamate; the surface additive; and the solvent. Any example and amounts of the surface additive and the solvent set forth herein may be used in this example.

When the acetophenone initiator, the phosphine oxide initiator, the brominated aromatic acrylate initiator, or the dithiocarbamate initiator is used, the respective initiator may be present in an amount ranging from greater than 0 mass % to about 10 mass %, based on the total solids of the resin composition. In one example, the acetophenone initiator, the phosphine oxide initiator, the brominated aromatic acrylate initiator, or the dithiocarbamate initiator is present in an amount ranging from about 2 mass % to about 8 mass %, based on the total solids of the resin composition.

Any example of the (meth)acrylate-based resin composition that includes the acetophenone initiator, the phosphine oxide initiator, the brominated aromatic acrylate initiator, or the dithiocarbamate initiator is ultraviolet light curable. In one example, a 365 nm UV light source may be used to cure this example of the resin composition. In another example, a broad spectrum light source (e.g., from about 270 nm to about 600 nm) may be used.

An example of a method for making any example of the (meth)acrylate-based resin compositions disclosed herein includes mixing the (meth)acrylate cyclosiloxane monomer and the non-siloxane (meth)acrylate based monomer at the mass ratio ranging from about >0:<100 to about 80:20, adding the surface additive to the mixture, and diluting the mixture with the solvent. Some examples further include mixing in any one of: the azo-initiator, the acetophenone initiator, the phosphine oxide initiator, the brominated aromatic acrylate initiator, or the dithiocarbamate initiator at the desired mass %.

Epoxy-Based Resin Compositions

Some of the examples disclosed herein are ultraviolet light curable epoxy-based resin compositions. In some examples, the ultraviolet light curable resin composition comprises or consists of a predetermined mass ratio of a first epoxy cyclosiloxane monomer having a 1:1 ratio of Si:O in the cyclosiloxane and a second epoxy cyclosiloxane monomer having a 1:1 ratio of Si:O in the cyclosiloxane, wherein the first and second epoxy cyclosiloxane monomers are different, and wherein the predetermined mass ratio ranges from about 3:7 to about 7:3; bis-(4-methylphenyl)iodonium hexafluorophosphate as a first initiator; a second initiator selected from the group consisting of a free radical initiator and a cationic initiator other than bis-(4-methylphenyl) iodonium hexafluorophosphate; a surface additive; and a solvent. When the resin composition consists of the listed components, it is to be understood that it does not include any other components.

In any of the epoxy-based resin compositions, two different epoxy cyclosiloxane monomers are used, where the ratio of silicon atoms to oxygen atoms in the rings of each monomer is 1:1. In an example, the first epoxy cyclosiloxane monomer is epoxycyclohexyl tetramethylcyclotetrasiloxane:

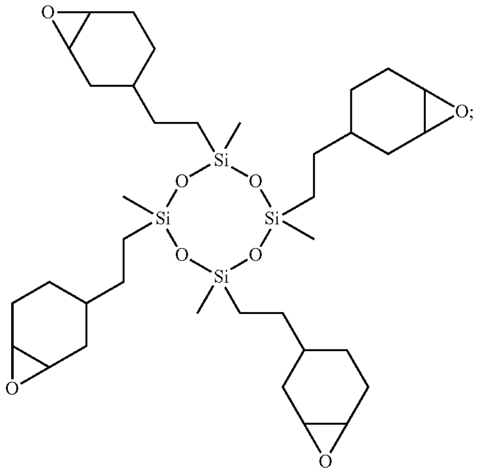 [SMILES: C[Si]1(CCC2CCC3OC3C2)O[Si](C)(CCC2CCC3OC3C2)O[Si](C)(CCC2CCC3OC3C2)O[Si](C)(CCC2CCC3OC3C2)O1]

and the second epoxy cyclosiloxane monomer is glycidyl cyclotetrasiloxane:

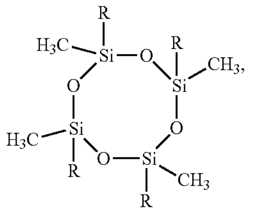

where R is:

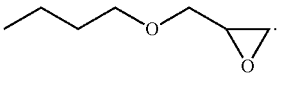

In any of the epoxy-based resin compositions, the predetermined mass ratio of the first epoxy cyclosiloxane monomer to the second epoxy cyclosiloxane monomer ranges from 3:7 to about 7:3. In one example, the mass ratio of the first epoxy cyclosiloxane monomer and the second epoxy cyclosiloxne monomer is 1.5:1.

In any of the epoxy-based resin compositions, the total amount of the combination of epoxy monomers ranges from about 61 mass % to less than 100 mass %, based on the total solids in the resin composition. The total amount of the epoxy monomers depends upon the other solids, e.g., the surface additive and the initiator (if included), that are present in the resin composition. In one example, the epoxy monomers make up from about 67 mass % to about 90 mass % of the total solids in the resin composition.

Similar to the (meth)acrylate-based resin compositions, the surface additive can be added to the epoxy-based resin compositions to adjust the surface tension. As noted herein, adjusting the surface tension can improve the detachability of the resin from an imprinting apparatus (e.g., a working stamp), improve the coatability of the resin composition, promote thin film stability, and/or improve leveling. Any example of the surface additive set forth for the (meth) acrylate-based resin compositions may be used in the epoxy-based resin compositions. The amount of the surface additive may be 3 mass % or less, based on the total mass of the epoxy-based resin compositions.

Any example of the epoxy-based resin composition may also include a solvent. Similar to the (meth)acrylate-based resin compositions, the solvent may be added to the epoxy-based resin composition to achieve a desired viscosity for the deposition technique being used to apply the resin composition. Examples of the resin composition viscosity (e.g., after the solvent is introduced) ranges from about 1.75 mPa to about 2.2 mPa (measured at 25° C.). The viscosity may also be higher or lower. Any example of the solvent set forth herein for the (meth)acrylate-based resin compositions may be used in the epoxy-based resin compositions. The total solids concentration of the epoxy-based resin composition may range from about 15 mass % to about 60 mass % (based on the total mass of the resin composition), and the amount of solvent may range from about 40 mass % to about 85 mass % (based on the mass of the resin composition). The upper limits of the total solids may be higher depending upon the respective solubility of the solid component(s) in the solvent that is selected. In some examples, the solid content is about 30% or less.

The epoxy-based resin compositions include a specific photoinitiator package, which includes bis-(4-methylphenyl)iodonium hexafluorophosphate as a first (cationic) initiator and a second initiator, where the second initiator is either a free radical initiator or a cationic initiator other than bis-(4-methylphenyl)iodonium hexafluorophosphate.

When the combination of bis-(4-methylphenyl)iodonium hexafluorophosphate and a free radical initiator are used, the free radicals generated by the free radical initiator react with the bis-(4-methylphenyl)iodonium hexafluorophosphate (which is a cationic initiator/photoacid generator), which decomposes to generate a superacid, which, in turn, initiates the polymerization and crosslinking of the epoxy monomers. It is believed that the bis-(4-methylphenyl)iodonium hexafluorophosphate and the selected free radical initiator do not undergo intramolecular interactions that lead to undesirable autofluorescence in violet and/or blue excitation wavelengths of interest.

When the second initiator is the free radical initiator, the free radical initiator is selected from the group consisting of 1,1,2,2-tetraphenyl-1,2-ethanediol:

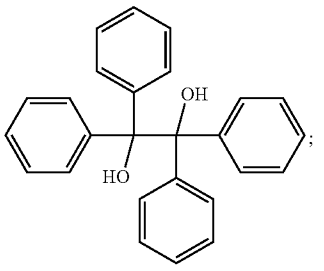 [SMILES: OC(c1ccccc1)(c1ccccc1)C(O)(c1ccccc1)c1ccccc1]

ethyl pyruvate:

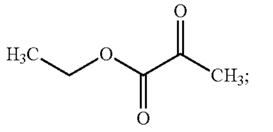

4-cyano-4-(phenylcarbonothioylthio)pentanoic acid:

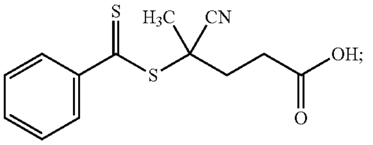 [SMILES: CC(C#N)(CCC(=O)O)SC(=S)c1ccccc1]

and ethyl-3-methyl-2-oxobutanoate:

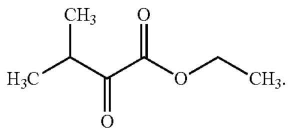

When the combination of bis-(4-methylphenyl)iodonium hexafluorophosphate and another cationic initiator are used, the combination of photoacid generators have a surprising synergistic effect that significantly and desirably alters the extent of cure, e.g., reduces corrected intensity at 2991 $cm^{-1}$ in a relatively short time period. It is believed that either or both of the cationic initiators behave as both superacid generators and as radical initiators.

When the second initiator is the cationic initiator, the cationic initiator is selected from the group consisting of bis[4-(tert-butyl)phenyl]iodonium tetra(nonafluoro-tert-butoxy)aluminate:

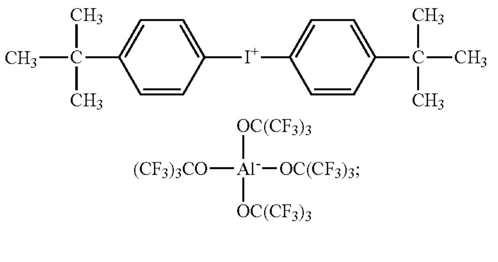

and tris(4-((4-acetylphenyl)thio)phenyl)-sulfonium tetrakis(perfluoro-phenyl)borate (PAG 290):

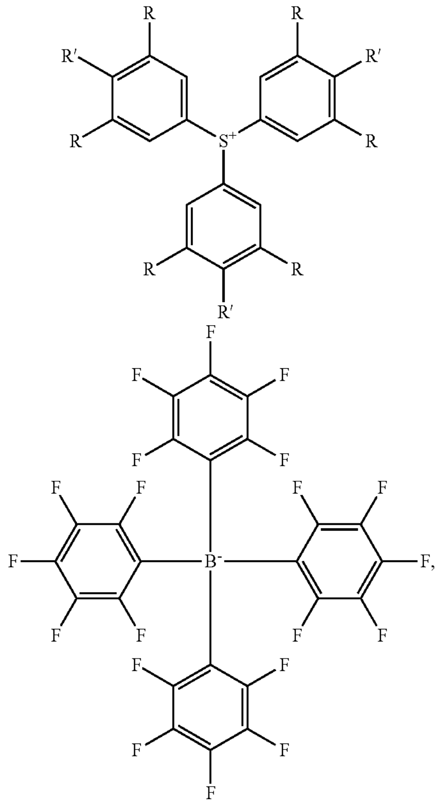

where R is

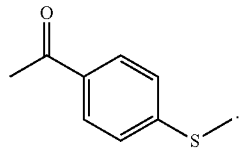

In an example of the epoxy-based resin composition, the bis-(4-methylphenyl)iodonium hexafluorophosphate is present in an amount ranging from about 3 mass % to about 10 mass %, based on a total solids content of the resin composition; and the second initiator is present in an amount ranging from about 1 mass % to about 26 mass %, based on the total solids content of the resin composition. In one example, the bis-(4-methylphenyl)iodonium hexafluorophosphate is present in an amount ranging from about 4 mass % to about 5 mass % and the second initiator is present in an amount ranging from about 2 mass % to about 26 mass %.

As mentioned, any example of the epoxy-based resins are ultraviolet light curable. In one example, a 365 nm UV light source may be used to cure this example of the resin composition.

An example of a method for making any example of the epoxy-based resin compositions disclosed herein includes mixing the first epoxy cyclosiloxane monomer and the second epoxy cyclosiloxane monomer at the mass ratio ranging from 3:7 to about 7:3, adding the initiators and the surface additive to the mixture, and dissolving the mixture with the solvent.

Flow Cells and Method

Any example of the resin composition disclosed herein may be used in the formation of the flow cell. The resin compositions may be patterned using nanoimprint lithography to generate the features of the flow cell. An example of the patterning method is shown schematically in FIG. 1A through FIG. 1C. The resulting flow cell surface (shown in FIG. 2) includes a substrate and a cured, patterned resin on the substrate, the cured, patterned resin including depressions separated by interstitial regions, and the cured, patterned resin having been formed from an example of the resin composition disclosed herein. Some examples of the method further include functionalizing the depressions for a particular application, such as sequencing. An example of the functionalization of the depressions is shown in FIG. 1D and FIG. 1E.

FIG. 1A depicts a substrate 12, and FIG. 1B depicts an example of the resin composition 10 deposited on the substrate 12.

Examples of suitable substrates 12 include epoxy siloxane, glass, modified or functionalized glass, plastics (including acrylics, polystyrene and copolymers of styrene and other materials, polypropylene, polyethylene, polybutylene, polyurethanes, polytetrafluoroethylene (such as TEFLON® from Chemours), cyclic olefins/cyclo-olefin polymers (COP) (such as ZEONOR® from Zeon), polyimides, etc.), nylon (polyamides), ceramics/ceramic oxides, silica, fused silica, or silica-based materials, aluminum silicate, silicon and modified silicon (e.g., boron doped p+ silicon), silicon nitride ($Si_3N_4$), silicon oxide ($SiO_2$), tantalum pentoxide ($Ta_2O_5$) or other tantalum oxide(s) ($TaO_x$), hafnium oxide ($HfO_2$), carbon, metals, or the like. The substrate 12 may also be glass or silicon, with a coating layer of tantalum oxide or another ceramic oxide at the surface.

Some examples of the substrate 12 may have a surface-bound silane attached thereto, which can react with resin composition components to attach the cured resin composition 10' to the substrate 12. This surface-bound silane is an adhesion promotor. An example of an acrylate adhesion promoter is 3-(Trimethoxysilyl)propyl methacrylate:

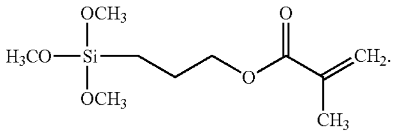 [SMILES: C=C(C)C(=O)OCCC[Si](OC)(OC)OC]

An example of an epoxy adhesion promoter is a norbornene silane, such as [(5-bicyclo[2.2.1]hept-2-enyl)ethyl] trimethoxysilane.

In an example, the substrate 12 may be a circular sheet, a panel, a wafer, a die etc. having a diameter ranging from about 2 mm to about 300 mm, e.g., from about 200 mm to about 300 mm, or may be a rectangular sheet, panel, wafer, die etc. having its largest dimension up to about 10 feet (~3 meters). As one example, a die may have a width ranging from about 0.1 mm to about 10 mm. While example dimensions have been provided, it is to be understood that the substrate 12 may have any suitable dimensions.

The resin composition 10 may be any examples of the resin composition described herein, including the (meth) acrylate-based resin compositions or the epoxy-based resin compositions. The resin composition 10 may be deposited on the substrate 12 using any suitable application technique, which may be manual or automated. As examples, the deposition of the resin composition 10 may be performed using vapor deposition techniques, coating techniques, grafting techniques, or the like. Some specific examples include chemical vapor deposition (CVD), spray coating (e.g., ultrasonic spray coating), spin coating, dunk or dip coating, doctor blade coating, puddle dispensing, aerosol printing, screen printing, microcontact printing, inkjet printing, or the like. In one example, spin coating is used.

The deposited resin composition 10 is then patterned, using any suitable patterning technique. In the example shown in FIG. 1B, nanoimprint lithography is used to pattern the resin composition 10. After the resin composition 10 is deposited, it may be softbaked to remove excess solvent and/or improve resin composition/substrate adhesion. When performed, the softbake may take place after the resin composition 10 is deposited and before the working stamp 14 is positioned therein, and at a relatively low temperature, ranging from about 50° C. to about 150° C., for greater than 0 seconds to about 3 minutes. In an example, the softbake time ranges from about 30 seconds to about 2.5 minutes.

As illustrated in FIG. 1B, a nanoimprint lithography imprinting apparatus 14 (e.g., a mold or working stamp) is pressed or rolled against the layer of the resin composition 10 to create an imprint on the resin composition 10. The imprinting apparatus 14 includes a template of the desired pattern that is to be transferred to the resin composition 10. Thus, the resin composition 10 is indented or perforated by the protrusions 16 of the working stamp 14. The protrusions 16 are a negative replica of the depressions or other features that are to be formed in the resin composition 10. The resin composition 10 may be then be cured with the working stamp 14 in place.

For some of the resin compositions 10 disclosed herein (i.e., any of the ultraviolet light curable resin compositions), curing may be accomplished by exposing the nanoimprinted, deposited resin composition 10 to incident light at a suitable energy dose (e.g., ranging from about 0.5 J to about 10 J) for 60 seconds or less. The incident light may be actinic radiation, such as ultraviolet (UV) radiation. In one example, the majority of the UV radiation emitted may have a wavelength of about 365 nm.

For some of the resin compositions 10 disclosed herein (i.e., any of the thermally curable resin compositions), curing may be accomplished by exposing the nanoimprinted, deposited resin composition 10 to heat at a suitable temperature (e.g., ranging from about 30° C. to about 150° C.) for 60 seconds or less. Any suitable heater, such as a hot plate, heating lamp, oven, etc. may be used. In one example, the heat is generated using a hot plate that the substrate 12 is positioned on.

In the examples disclosed herein, the light or heat energy exposure initiates polymerization and crosslinking of the monomers in the resin composition 10. With the effective extent of curing of the resin compositions 10 set forth herein, the incident light or heat exposure time may be 60 seconds or less. In some instances, the incident light or heat exposure time may be 30 seconds or less. In still other instances, the incident light or heat exposure time may be about 20 seconds. The curing process may include a single UV exposure stage or a single heating event.

After curing, the imprinting apparatus 14 may be removed. Upon release of the imprinting apparatus 14, topographic features, e.g., the depressions 18, are defined in the resin composition 10. The resin composition 10 having the depressions 18 defined therein is referred to as the cured, patterned resin 10' (shown in FIG. 1C).

Due, at least in part, to the efficient photo or thermal polymerization of the resin compositions 10 disclosed herein, the method disclosed herein may not involve a post curing hardbake step in order to attain well-cured films. In some instances, it may be desirable to perform the post curing hardbake. It is to be understood that the working stamp 14 is released/detached before the hardbake (if performed), e.g., so that the working stamp 14 does not bond to the cured, patterned resin composition 10'. The duration of the hardbake may last from about 5 seconds to about 10 minutes at a temperature ranging from about 100° C. to about 300° C. Hardbaking may be performed, for example, to remove residual solvent(s) from the cured, patterned resin composition 10', to further polymerization of some of the resin composition material(s) (and thus enhance the extent of curing), to improve adhesion and/or mechanical properties, and/or to further reduce the autofluorescence. Any of the heating devices set forth herein may be used for hardbaking.

The chemical make-up of the cured, patterned resin 10' depends upon the resin composition 10 that is used.

As shown in FIG. 1C, the cured, patterned resin 10' includes the depressions 18 defined therein, and interstitial regions 20 separating adjacent depressions 18. In the examples disclosed herein, the depressions 18 become functionalized with a polymeric hydrogel 22 (FIG. 1D and FIG. 1E) and primers 24, 26 (FIG. 1E and FIG. 2), while portions of the interstitial regions 20 may be used for bonding but will not have the polymeric hydrogel 22 or the primer(s) 24, 26 thereon.

Many different layouts of the depressions 18 may be envisaged, including regular, repeating, and non-regular patterns. In an example, the depressions 18 are disposed in a hexagonal grid for close packing and improved density. Other layouts may include, for example, rectangular layouts (e.g., lines or trenches), triangular layouts, and so forth. In some examples, the layout or pattern can be an x-y format of depressions 18 that are in rows and columns. In some other examples, the layout or pattern can be a repeating arrangement of depressions 18 and/or interstitial regions 20. In still other examples, the layout or pattern can be a random arrangement of depressions 18 and/or interstitial regions 20. The pattern may include stripes, swirls, lines, triangles, rectangles, circles, arcs, checks, plaids, diagonals, arrows, squares, and/or cross-hatches. In an example, the depressions 18 are wells arranged in rows and columns, as shown in FIG. 1C.

The layout or pattern of the depressions 18 may be characterized with respect to the density of the depressions 18 (i.e., number of depressions 18) in a defined area. For example, the depressions 18 may be present at a density of approximately 2 million per $mm^2$. The density may be tuned to different densities including, for example, a density of at least about 100 per $mm^2$, about 1,000 per $mm^2$, about 0.1 million per $mm^2$, about 1 million per $mm^2$, about 2 million per $mm^2$, about 5 million per $mm^2$, about 10 million per $mm^2$, about 50 million per $mm^2$, or more, or less. It is to be further understood that the density of depressions 18 in the cured, patterned resin 10' can be between one of the lower values and one of the upper values selected from the ranges above. As examples, a high density array may be characterized as having depressions 18 separated by less than about 100 nm, a medium density array may be characterized as having depressions 18 separated by about 400 nm to about 1 μm, and a low density array may be characterized as having depressions 18 separated by greater than about 1 μm. While example densities have been provided, it is to be understood that substrates with any suitable densities may be used.

The layout or pattern of the depressions 18 may also or alternatively be characterized in terms of the average pitch, i.e., the spacing from the center of the depression 18 to the center of an adjacent depression 18 (center-to-center spacing) or from the right edge of one depression 18 to the left edge of an adjacent depression 18 (edge-to-edge spacing). The pattern can be regular, such that the coefficient of variation around the average pitch is small, or the pattern can be non-regular in which case the coefficient of variation can be relatively large. In either case, the average pitch can be, for example, at least about 10 nm, about 50 nm, about 0.1 μm, about 0.5 μm, about 1 μm, about 5 μm, about 10 μm, about 100 μm, or more, or less. The average pitch for a particular pattern of depressions 18 can be between one of the lower values and one of the upper values selected from the ranges above. In an example, the depressions 18 have a pitch (center-to-center spacing) of about 1.5 μm. While example average pitch values have been provided, it is to be understood that other average pitch values may be used.

The size of each depression 18 may be characterized by its volume, opening area, depth, and/or diameter.

Each depression 18 can have any volume that is capable of confining a fluid. The minimum or maximum volume can be selected, for example, to accommodate the throughput (e.g., multiplexity), resolution, nucleotides, or analyte reactivity expected for downstream uses of the flow cell. For example, the volume can be at least about $1\times10^{-3}$ $\mu m^3$, about $1\times10^{-2}$ $\mu m^3$, about 0.1 $\mu m^3$, about 1 $\mu m^3$, about 10 $\mu m^3$, about 100 $\mu m^3$, or more, or less. It is to be understood that the polymeric hydrogel 22 can fill all or part of the volume of a depression 18.

The area occupied by each depression opening can be selected based upon similar criteria as those set forth above for well volume. For example, the area for each depression opening can be at least about $1\times10^{-3}$ $\mu m^2$, about $1\times10^{-2}$ $\mu m^2$, about 0.1 $\mu m^2$, about 1 $\mu m^2$, about 10 $\mu m^2$, about 100 $\mu m^2$, or more, or less. The area occupied by each depression opening can be greater than, less than or between the values specified above.

The depth of each depression 18 can be large enough to house some of the polymeric hydrogel 22. In an example, the depth may be about 0.1 μm, about 0.5 μm, about 1 μm, about 10 μm, about 100 μm, or more, or less. In some examples, the depth is about 0.4 μm. The depth of each depression 18 can be greater than, less than or between the values specified above.

In some instances, the diameter or length and width of each depression 18 can be about 50 nm, about 0.1 μm, about 0.5 μm, about 1 μm, about 10 μm, about 100 μm, or more, or less. The diameter or length and width of each depression 18 can be greater than, less than or between the values specified above.

After the resin composition 10 is patterned and cured, the cured, patterned resin 10' may be treated to prepare the surface for application of a polymeric hydrogel 22.

In an example, the cured, patterned resin 10' may be exposed to silanization, which attaches a silane or the silane derivative to the cured, patterned resin 10'. Silanization introduces the silane or the silane derivative across the surface, including in the depressions 18 (e.g., on the bottom surface and along the side walls) and on the interstitial regions 20.

Silanization may be accomplished using any silane or silane derivative. The selection of the silane or silane derivative may depend, in part, upon the functionalized molecule that is to be used to form the polymeric hydrogel 22 (shown in FIG. 1D), as it may be desirable to form a covalent bond between the silane or silane derivative and the polymeric hydrogel 22. The method used to attach the silane or silane derivative to the cured, patterned resin 10' may vary depending upon the silane or silane derivative that is being used. Several examples are set forth herein.

Examples of suitable silanization methods include vapor deposition, spin coating, or other deposition methods. Some examples of methods and materials that may be used to silanize the cured, patterned resin 10' are described herein, although it is to be understood that other methods and materials may be used.

The attachment of the silane or silane derivative forms a pre-treated (e.g., silanized) cured, patterned resin 10', which includes silanized depressions and silanized interstitial regions.

In other examples, the cured, patterned resin 10' may not be exposed to silanization. Rather, the cured, patterned resin 10' may be exposed to plasma ashing, and then the polymeric hydrogel 22 may be directly spin coated (or otherwise deposited) on the plasma ashed cured, patterned resin 10'. In this example, plasma ashing may generate surface-activating agent(s) (e.g., hydroxyl (C—OH or Si—OH) and/or carboxyl groups) that can adhere the polymeric hydrogel 22 to the cured, patterned resin 10'. In these examples, the polymeric hydrogel 22 is selected so that it reacts with the surface groups generated by plasma ashing.

In still other examples, the cured, patterned resin 10' may include unreacted epoxy groups; and thus may not be exposed to silanization because the unreacted epoxy groups can react directly with amino functional groups of the polymeric hydrogel 22. In this example, plasma ashing may be performed, e.g., if it is desirable to clean the surface of potential contaminants.

The polymeric hydrogel 22 may then be applied to the pre-treated cured, patterned resin 10' (as shown in FIG. 1D). The polymeric hydrogel 22 may be any gel material that can swell when liquid is taken up and can contract when liquid is removed, e.g., by drying. In an example, the polymeric hydrogel 22 includes an acrylamide copolymer. Some examples of the acrylamide copolymer are represented by the following structure (I):

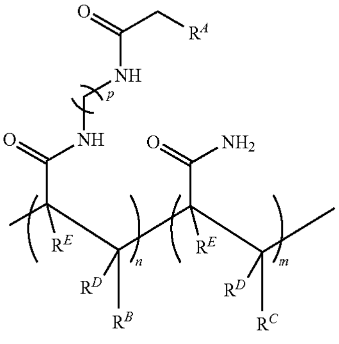

wherein:

$R^A$ is selected from the group consisting of azido, optionally substituted amino, optionally substituted alkenyl, optionally substituted alkyne, halogen, optionally substituted hydrazone, optionally substituted hydrazine, carboxyl, hydroxy, optionally substituted tetrazole, optionally substituted tetrazine, nitrile oxide, nitrone, sulfate, and thiol;

$R^B$ is H or optionally substituted alkyl;

$R^C$, $R^D$, and $R^E$ are each independently selected from the group consisting of H and optionally substituted alkyl;

each of the $-(CH_2)_p-$ can be optionally substituted;

p is an integer in the range of 1 to 50;

n is an integer in the range of 1 to 50,000; and m is an integer in the range of 1 to 100,000.

One specific example of the acrylamide copolymer represented by structure (I) is poly(N-(5-azidoacetamidylpentyl)acrylamide-co-acrylamide, PAZAM.

One of ordinary skill in the art will recognize that the arrangement of the recurring "n" and "m" features in structure (I) are representative, and the monomeric subunits may be present in any order in the polymer structure (e.g., random, block, patterned, or a combination thereof).

The molecular weight of the acrylamide copolymer may range from about 5 kDa to about 1500 kDa or from about 10 kDa to about 1000 kDa, or may be, in a specific example, about 312 kDa.

In some examples, the acrylamide copolymer is a linear polymer. In some other examples, the acrylamide copolymer is a lightly cross-linked polymer.

In other examples, the polymeric hydrogel 22 may be a variation of structure (I). In one example, the acrylamide unit may be replaced with N,N-dimethylacrylamide ( 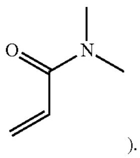 ).

In this example, the acrylamide unit in structure (I) may be replaced with,

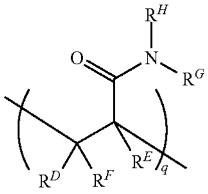

where $R^D$, $R^E$, and RF are each H or a C1-C6 alkyl, and $R^G$ and $R^H$ are each a C1-C6 alkyl (instead of H as is the case with the acrylamide). In this example, q may be an integer in the range of 1 to 100,000. In another example, the N,N-dimethylacrylamide may be used in addition to

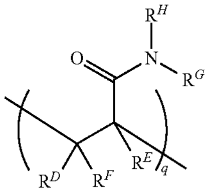

the acrylamide unit. In this example, structure (I) may include in addition to the recurring "n" and "m" features, where $R^D$, $R^E$, and RF are each H or a C1-C6 alkyl, and $R^G$ and $R^H$ are each a C1-C6 alkyl. In this example, q may be an integer in the range of 1 to 100,000.

As another example of the polymeric hydrogel 22, the recurring "n" feature in structure (I) may be replaced with a monomer including a heterocyclic azido group having structure (II):

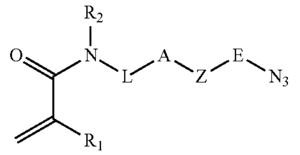

wherein $R^1$ is H or a C1-C6 alkyl; $R_2$ is H or a C1-C6 alkyl; L is a linker including a linear chain with 2 to 20 atoms selected from the group consisting of carbon, oxygen, and nitrogen and 10 optional substituents on the carbon and any nitrogen atoms in the chain; E is a linear chain including 1 to 4 atoms selected from the group consisting of carbon, oxygen and nitrogen, and optional substituents on the carbon and any nitrogen atoms in the chain; A is an N substituted amide with an H or a C1-C4 alkyl attached to the N; and Z is a nitrogen containing heterocycle. Examples of Z include 5 to 10 carbon-containing ring members present as a single cyclic structure or a fused structure. Some specific examples of Z include pyrrolidinyl, pyridinyl, or pyrimidinyl. As still another example, the gel material may include a recurring unit of each of structure (III) and (IV):

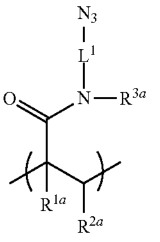

and

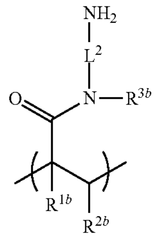

wherein each of $R^{1a}$, $R^{2a}$, $R^{1b}$ and $R^{2b}$ is independently selected from hydrogen, an optionally substituted alkyl or optionally substituted phenyl; each of $R^{3a}$ and $R^{3b}$ is independently selected from hydrogen, an optionally substituted alkyl, an optionally substituted phenyl, or an optionally substituted C7-C14 aralkyl; and each $L^1$ and $L^2$ is independently selected from an optionally substituted alkylene linker or an optionally substituted heteroalkylene linker.

In still another example, the acrylamide copolymer is formed using nitroxide mediated polymerization, and thus at least some of the copolymer chains have an alkoxyamine end group. In the copolymer chain, the term "alkoxyamine end group" refers to the dormant species —$ONR_1R_2$, where each of $R_1$ and $R_2$ may be the same or different, and may independently be a linear or branched alkyl, or a ring structure, and where the oxygen atom is attached to the rest of the copolymer chain. In some examples, the alkoxyamine may also be introduced into some of the recurring acrylamide monomers, e.g., at position $R^A$ in structure (I). As such, in one example, structure (I) includes an alkoxyamine end group; and in another example, structure (I) includes an alkoxyamine end group and alkoxyamine groups in at least some of the side chains.

It is to be understood that other molecules may be used as the polymeric hydrogel 22, as long as they are capable of being functionalized with the desired chemistry, e.g., primers 24, 26. Some examples of suitable materials for the polymeric hydrogel 22 include functionalized silanes, such as norbornene silane, azido silane, alkyne functionalized silane, amine functionalized silane, maleimide silane, or any other silane having functional groups that can respectively attach the desired chemistry. Still other examples of suitable materials for the polymeric hydrogel 22 include those having a colloidal structure, such as agarose; or a polymer mesh structure, such as gelatin; or a cross-linked polymer structure, such as polyacrylamide polymers and copolymers, silane free acrylamide (SFA), or an azidolyzed version of SFA. Examples of suitable polyacrylamide polymers may be synthesized from acrylamide and an acrylic acid or an acrylic acid containing a vinyl group, or from monomers that form [2+2] photo-cycloaddition reactions. Still other examples of suitable materials for the polymeric hydrogel 22 include mixed copolymers of acrylamides and acrylates. A variety of polymer architectures containing acrylic monomers (e.g., acrylamides, acrylates etc.) may be utilized in the examples disclosed herein, such as branched polymers, including dendrimers (e.g., multi-arm or star polymers), and the like. For example, the monomers (e.g., acrylamide, acrylamide containing the catalyst, etc.) may be incorporated, either randomly or in block, into the branches (arms) of a dendrimer.

The polymeric hydrogel 22 may be deposited on the surface of the pre-treated cured, patterned resin 10' using spin coating, or dipping or dip coating, or flow of the functionalized molecule under positive or negative pressure, or another suitable technique. The polymeric hydrogel 22 may be present in a mixture. In an example, the mixture includes PAZAM in water or in an ethanol and water mixture.

After being coated, the polymeric hydrogel 22 may also be exposed to a curing process to form a coating of the polymeric hydrogel 22 across the entire patterned substrate (i.e., in depression(s) 18 and on interstitial region(s) 20). In an example, curing the polymeric hydrogel 22 may take place at a temperature ranging from room temperature (e.g., about 25° C.) to about 95° C. for a time ranging from about 1 millisecond to about several days. In another example, the time may range from 10 seconds to at least 24 hours. In still another example, the time may range from about 5 minutes to about 2 hours.

The attachment of the polymeric hydrogel 22 to the depressions 18 and interstitial regions 20 may be through covalent bonding. The covalent linking of the polymeric hydrogel 22 to the silanized or plasma ashed depressions is helpful for maintaining the polymeric hydrogel 22 in the depressions 18 throughout the lifetime of the ultimately formed flow cell during a variety of uses. The following are some examples of reactions that can take place between the silane or silane derivative and the polymeric hydrogel 22.

When the silane or silane derivative includes norbornene or a norbornene derivative as the unsaturated moiety, the norbornene or a norbornene derivative can: i) undergo a 1,3-dipolar cycloaddition reaction with an azide/azido group of PAZAM; ii) undergo a coupling reaction with a tetrazine group attached to PAZAM; undergo a cycloaddition reaction with a hydrazone group attached to PAZAM; undergo a photo-click reaction with a tetrazole group attached to PAZAM; or undergo a cycloaddition with a nitrile oxide group attached to PAZAM.

When the silane or silane derivative includes cyclooctyne or a cyclooctyne derivative as the unsaturated moiety, the cyclooctyne or cyclooctyne derivative can: i) undergo a strain-promoted azide-alkyne 1,3-cycloaddition (SPAAC)

reaction with an azide/azido of PAZAM, or ii) undergo a strain-promoted alkyne-nitrile oxide cycloaddition reaction with a nitrile oxide group attached to PAZAM.

When the silane or silane derivative includes a bicyclononyne as the unsaturated moiety, the bicyclononyne can undergo similar SPAAC alkyne cycloaddition with azides or nitrile oxides attached to PAZAM due to the strain in the bicyclic ring system.

To form the polymeric hydrogel 22 in the depression(s) 18 and not on the interstitial region(s) 20 of the cured, patterned resin 10', the polymeric hydrogel 22 may be polished off of the interstitial regions 20. The polishing process may be performed with a chemical slurry (including, e.g., an abrasive, a buffer, a chelating agent, a surfactant, and/or a dispersant) which can remove the polymeric hydrogel 22 from the interstitial regions 20 without deleteriously affecting the underlying cured, patterned resin 10' and/or substrate 12 at those regions. Alternatively, polishing may be performed with a solution that does not include the abrasive particles. The chemical slurry may be used in a chemical mechanical polishing system. In this example, polishing head(s)/pad(s) or other polishing tool(s) is/are capable of polishing the polymeric hydrogel 22 from the interstitial regions 20 while leaving the polymeric hydrogel 22 in the depressions 18 and leaving the underlying cured, patterned resin 10' at least substantially intact. As an example, the polishing head may be a Strasbaugh ViPRR II polishing head. In another example, polishing may be performed with a polishing pad and a solution without any abrasive. For example, the polish pad may be utilized with a solution free of the abrasive particle (e.g., a solution that does not include abrasive particles).

FIG. 1D depicts the polymeric hydrogel 22 in the depressions 18 and not on the interstitial regions 20. A cleaning process may then be performed. This process may utilize a water bath and sonication. The water bath may be maintained at a relatively low temperature ranging from about 22° C. to about 30° C. The silanized, coated, and polished patterned substrate may also be spin dried, or dried via another suitable technique.

As shown in FIG. 1E, a grafting process is performed in order to graft primer(s) 24, 26 to the polymeric hydrogel 22 in the depression(s) 19. The primers 24, 26 may be any forward amplification primer and/or reverse amplification primer. In this example, the primers 24, 26 are two different primers.

It is desirable for the primers 24, 26 to be immobilized to the polymeric hydrogel 22. In some examples, immobilization may be by single point covalent attachment to the polymeric hydrogel 22 at the 5' end of the respective primers 24, 26. Any suitable covalent attachment means known in the art may be used. In some examples, immobilization may be by strong non-covalent attachment (e.g., biotin-streptavidin).

Each of the primers 24, 26 has a universal sequence for capture and/or amplification purposes. As examples, the primers 24, 26 may include P5 and P7 primers, P15 and P7 primers, or any combination of the PA primers, the PB primers, the PC primers, and the PD primers set forth herein. As examples, the primers 24, 26 may include any two PA, PB, PC, and PD primers, or any combination of one PA primer and one PB, PC, or PD primer, or any combination of one PB primer and one PC or PD primer, or any combination of one PC primer and one PD primer.

Examples of P5 and P7 primers are used on the surface of commercial flow cells sold by Illumina Inc. for sequencing, for example, on HISEQ™, HISEQX™, MISEQ™, MISEQDX™, MINISEQ™, NEXTSEQ™, NEXTSEQDX™, NOVASEQ™, ISEQ™, GENOME ANALYZER™, and other instrument platforms. The P5 primer is:

P5: 5'→3'

```
                                    (SEQ. ID. NO. 1)
AATGATACGGCGACCACCGAGAUCTACAC
```

The P7 primer may be any of the following:

P7 #1: 5'→3'

```
                                    (SEQ. ID. NO. 2)
CAAGCAGAAGACGGCATACGAnAT
```

P7 #2: 5'→3'

```
                                    (SEQ. ID. NO. 3)
CAAGCAGAAGACGGCATACnAGAT
```

where "n" is 8-oxoguanine in each of the sequences.

The P15 primer is:

P15: 5'→3'

```
                                    (SEQ. ID. NO. 4)
AATGATACGGCGACCACCGAGAnCTACAC
```

where "n" is allyl-T.

The other primers (PA-PD) mentioned above include:

PA 5'→3'

```
                                    (SEQ. ID. NO. 5)
GCTGGCACGTCCGAACGCTTCGTTAATCCGTTGAG
```

PB 5'→3'

```
                                    (SEQ. ID. NO. 6)
CGTCGTCTGCCATGGCGCTTCGGTGGATATGAACT
```

PC 5'→3'

```
                                    (SEQ. ID. NO. 7)
ACGGCCGCTAATATCAACGCGTCGAATCCGCAACT
```

PD 5'→3'

```
                                    (SEQ. ID. NO. 8)
GCCGCGTTACGTTAGCCGGACTATTCGATGCAGC
```

The P5, P7, and P15 sequences illustrate the cleavage sites. While not shown in the example sequences for PA-PD, it is to be understood that any of these primers may include a cleavage site, such as uracil, 8-oxoguanine, allyl-T, etc. at any point in the strand. In any of the examples, the cleavage sites of the primers 24, 26 should be different from each other so that cleavage of the primers 24, 26 does not take place at the same time. Examples of suitable cleavage sites include enzymatically cleavable nucleobases or chemically cleavable nucleobases, modified nucleobases, or linkers (e.g., between nucleobases). The enzymatically cleavable nucleobase may be susceptible to cleavage by reaction with a glycosylase and an endonuclease, or with an exonuclease. One specific example of the cleavable nucleobase is deoxyuracil (dU), which can be targeted by the USER enzyme. In an example, the uracil base may be incorporated at the $7^{th}$ base position from the 3' end of the P5 primer (P5U) or of the P7 primer (P7U). Other abasic sites may also be used. Examples of the chemically cleavable nucleobases, modified nucleobases, or linkers include 8-oxoguanine, a vicinal diol, a disulfide, a silane, an azobenzene, a photocleavable group, allyl T (a thymine nucleotide analog having an allyl functionality), allyl ethers, or an azido functional ether.

Each of the primers disclosed herein may also include a polyT sequence at the 5' end of the primer sequence. In some examples, the polyT region includes from 2 T bases to 20 T bases. As specific examples, the polyT region may include 3, 4, 5, 6, 7, or 10 T bases.

The 5' end of each primer may also include a linker. Any linker that includes a terminal alkyne group or another suitable terminal functional group that can attach to the surface functional groups of the polymeric hydrogel 22 may be used. Examples of suitable terminal functional group including a tetrazine, an azido, an amino, an epoxy or glycidyl, a thiophosphate, a thiol, an aldehyde, a hydrazine, a phosphoramidite, a triazolinedione, or biotin. In one example, the primers 24, 26 are terminated with hexynyl. In some specific examples, a succinimidyl (NHS) ester terminated primer may be reacted with an amine at a surface of the polymeric hydrogel 22, an aldehyde terminated primer may be reacted with a hydrazine at a surface of the polymeric hydrogel 22, or an alkyne terminated primer may be reacted with an azide at a surface of the polymeric hydrogel 22, or an azide terminated primer may be reacted with an alkyne or DBCO (dibenzocyclooctyne) at a surface of the polymeric hydrogel 22, or an amino terminated primer may be reacted with an activated carboxylate group or NHS ester at a surface of the polymeric hydrogel 22, or a thiol terminated primer may be reacted with an alkylating reactant (e.g., iodoacetamine or maleimide) at a surface of the polymeric hydrogel 22, a phosphoramidite terminated primer may be reacted with a thioether at a surface of the polymeric hydrogel 22, or a biotin-modified primer may be reacted with streptavidin at a surface of the polymeric hydrogel 22.

In an example, grafting of the primers 24, 26 may be accomplished by flow through deposition (e.g., using a temporarily bound lid), dunk coating, spray coating, puddle dispensing, or by another suitable method that will attach the primer(s) 24, 26 to the polymeric hydrogel 22. Each of these example techniques may utilize a primer solution or mixture, which may include the primer(s) 24, 24', water, a buffer, and a catalyst.

Dunk coating may involve submerging the flow cell precursor (shown in FIG. 1D) into a series of temperature controlled baths. The baths may also be flow controlled and/or covered with a nitrogen blanket. The baths may include the primer solution or mixture. Throughout the various baths, the primer(s) 24, 26 will attach to the primer-grafting functional group(s) of the polymeric hydrogel 22 in at least some of the depression(s) 18. In an example, the flow cell precursor will be introduced into a first bath including the primer solution or mixture where a reaction takes place to attach the primer(s) 24, 26, and then moved to additional baths for washing. Movement from bath to bath may involve a robotic arm or may be performed manually. A drying system may also be used in dunk coating.

Spray coating may be accomplished by spraying the primer solution or mixture directly onto the flow cell precursor. The spray coated wafer may be incubated for a time ranging from about 4 minutes to about 60 minutes at a temperature ranging from about 0° C. to about 70° C. After incubation, the primer solution or mixture may be diluted and removed using, for example, a spin coater.

Puddle dispensing may be performed according to a pool and spin off method, and thus may be accomplished with a spin coater. The primer solution or mixture may be applied (manually or via an automated process) to the flow cell precursor. The applied primer solution or mixture may be applied to or spread across the entire surface of the flow cell precursor. The primer coated flow cell precursor may be incubated for a time ranging from about 2 minutes to about 60 minutes at a temperature ranging from about 0° C. to about 80° C. After incubation, the primer solution or mixture may be diluted and removed using, for example, the spin coater.

In other example, the primers 24, 26 may be pre-grafted to the polymeric hydrogel 22, and thus may be present in the depressions 18 once the polymeric hydrogel 22 is applied.

FIG. 1E and FIG. 2 illustrate an example of the flow cell surface after primer 24, 26 grafting.

The examples shown in FIGS. 1E and 2 are examples of the flow cell surface without a lid or other flow cell surface bonded thereto. In an example, the lid may be bonded to at least a portion of the cured, patterned resin 10', e.g., at some of the interstitial regions 20. The bond that is formed between the lid and the cured, patterned resin 10' may be a chemical bond, or a mechanical bond (e.g., using a fastener, etc.).

The lid may be any material that is transparent to an excitation light that is directed toward the substrate 12 and the cured, patterned resin 10'. As examples, the lid may be glass (e.g., borosilicate, fused silica, etc.), plastic, or the like. A commercially available example of a suitable borosilicate glass is D 263®, available from Schott North America, Inc. Commercially available examples of suitable plastic materials, namely cyclo olefin polymers, are the ZEONOR® products available from Zeon Chemicals L.P.

The lid may be bonded to the cured, patterned resin 10' using any suitable technique, such as laser bonding, diffusion bonding, anodic bonding, eutectic bonding, plasma activation bonding, glass frit bonding, or others methods known in the art. In an example, a spacer layer may be used to bond the lid to the cured, patterned resin 10'. The spacer layer may be any material that will seal at least some of the cured, patterned resin 10' and the lid together. In some examples, the spacer layer can be a radiation-absorbing material that aids in bonding of the cured, patterned resin 10' and the lid.

In other examples, two of the flow cells surfaces (shown in FIG. 1E and FIG. 2) may be bonded together so that the depressions 18 face a flow channel formed therebetween. The flow cells may be bonded at interstitial regions 20 using similar techniques and materials described herein for bonding the lid.

One example of the flow cell disclosed herein includes at least one flow cell surface that comprises the substrate 12; and the cured, patterned resin 10' on the substrate 12, the cured, patterned resin 10' including depressions 18 separated by interstitial regions 20, and the cured, patterned resin 10' including a cured form of a resin composition 10 including: a predetermined mass ratio of a (meth)acrylate cyclosiloxane monomer and a non-siloxane (meth)acrylate based monomer ranging from about >0:<100 to about 80:20; from 0 mass % to about 10 mass %, based on a total solids content of the resin composition, of an initiator selected from the group consisting of an azo-initiator, an acetophenone, a phosphine oxide, a brominated aromatic acrylate, and a dithiocarbamate; a surface additive; and a solvent; wherein the cured, patterned resin 10' has low or no autofluorescence when exposed to violet or blue excitation wavelengths ranging from about 375 nm to about 500 nm.

Another example of the flow cell disclosed herein includes at least one flow cell surface that comprises the substrate 12; and the cured, patterned resin 10' on the substrate 12, the cured, patterned resin 10' including depressions 18 separated by interstitial regions 20, and the cured, patterned resin 10' including a cured form of a resin composition 10 including: a predetermined mass ratio of a first epoxy cyclosiloxane monomer having a 1:1 ratio of Si:O in the cyclosiloxane and a second epoxy cyclosiloxane monomer having a 1:1 ratio of Si:O in the cyclosiloxane, wherein the first and second epoxy cyclosiloxane monomers are different, and wherein the predetermined mass ratio ranges from about 3:7 to about 7:3; bis-(4-methylphenyl)iodonium hexafluorophosphate as a first initiator; a second initiator selected from the group consisting of a free radical initiator and a cationic initiator other than bis-(4-methylphenyl) iodonium hexafluorophosphate; a surface additive; and a solvent; wherein the cured, patterned resin 10' has low or no autofluorescence when exposed to violet or blue excitation wavelengths ranging from about 375 nm to about 500 nm.

Methods for Using the Flow Cell

The flow cells disclosed herein may be used in a variety of sequencing approaches or technologies, including techniques often referred to as sequencing-by-synthesis (SBS), cyclic-array sequencing, sequencing-by-ligation, pyrosequencing, and so forth. With any of these techniques, since the polymeric hydrogel 22 and attached primer(s) 24, 26 are present in the depressions 18 and not on the interstitial regions 20, amplification will be confined to the depressions.

As one example, a sequencing by synthesis (SBS) reaction may be run on a system such as the HISEQ™, HISEQX™, MISEQ™, MISEQDX™, MINISEQ™, NOVASEQ™, ISEQ™, NEXTSEQDX™, or NEXTSEQ™ sequencer systems from Illumina (San Diego, CA). In SBS, extension of a nucleic acid primer (e.g., a sequencing primer) along a nucleic acid template (i.e., the sequencing template) is monitored to determine the sequence of nucleotides in the template. The underlying chemical process can be polymerization (e.g., catalyzed by a polymerase enzyme) or ligation (e.g., catalyzed by a ligase enzyme). In a particular polymerase-based SBS process, fluorescently labeled nucleotides are added to the sequencing primer (thereby extending the sequencing primer) in a template dependent fashion such that detection of the order and type of nucleotides added to the sequencing primer can be used to determine the sequence of the template.

Prior to sequencing, the capture and amplification primers 24, 26 can be exposed to a sequencing library, which is amplified using any suitable method, such as cluster generation.

In one example of cluster generation, the library fragments are copied from the hybridized primers 24, 26 by 3' extension using a high-fidelity DNA polymerase. The original library fragments are denatured, leaving the copies immobilized. Isothermal bridge amplification may be used to amplify the immobilized copies. For example, the copied templates loop over to hybridize to an adjacent, complementary primer 24, 26 and a polymerase copies the copied templates to form double stranded bridges, which are denatured to form two single stranded strands. These two strands loop over and hybridize to adjacent, complementary primers 24, 26 and are extended again to form two new double stranded loops. The process is repeated on each template copy by cycles of isothermal denaturation and amplification to create dense clonal clusters. Each cluster of double stranded bridges is denatured. In an example, the reverse strand is removed by specific base cleavage, leaving forward template polynucleotide strands. Clustering results in the formation of several template polynucleotide strands in each of the depressions 18. This example of clustering is bridge amplification, and is one example of the amplification that may be performed. It is to be understood that other amplification techniques may be used, such as the exclusion amplification (Examp) workflow (Illumina Inc.).

A sequencing primer may be introduced that hybridizes to a complementary sequence on the template polynucleotide strand. This sequencing primer renders the template polynucleotide strand ready for sequencing. The 3'-ends of the templates and any flow cell-bound primers 24, 26 (not attached to the copy) may be blocked to prevent interference with the sequencing reaction, and in particular, to prevent undesirable priming.

To initiate sequencing, an incorporation mix may be added to the flow cell. In one example, the incorporation mix includes a liquid carrier, a polymerase, and fluorescently labeled nucleotides. The fluorescently labeled nucleotides may include a 3' OH blocking group. When the incorporation mix is introduced into the flow cell, the fluid enters a flow channel and flows into the depressions 18 (where the template polynucleotide strands are present).

The fluorescently labeled nucleotides are added to the sequencing primer (thereby extending the sequencing primer) by the polymerase in a template dependent fashion such that detection of the order and type of nucleotides added to the sequencing primer can be used to determine the sequence of the template. More particularly, one of the nucleotides is incorporated, by a respective polymerase, into a nascent strand that extends the sequencing primer and that is complementary to the template polynucleotide strand. In other words, in at least some of the template polynucleotide strands across the flow cell, respective polymerases extend the hybridized sequencing primer by one of the nucleotides in the incorporation mix.

The incorporation of the nucleotides can be detected through an imaging event. During an imaging event, an illumination system (not shown) may provide an excitation light to the flow cell surface(s).

In some examples, the nucleotides can further include a reversible termination property (e.g., the 3' OH blocking group) that terminates further primer extension once a nucleotide has been added to the sequencing primer. For example, a nucleotide analog having a reversible terminator moiety can be added to the sequencing primer such that subsequent extension cannot occur until a deblocking agent is delivered to remove the moiety. Thus, for examples that use reversible termination, a deblocking reagent can be delivered to the flow cell after detection occurs.

Wash(es) may take place between the various fluid delivery steps. The SBS cycle can then be repeated n times to extend the sequencing primer by n nucleotides, thereby detecting a sequence of length n.

In some examples, the forward strands may be sequenced and removed, and then reverse strands are constructed and sequenced as described herein.

While SBS has been described in detail, it is to be understood that the flow cells described herein may be utilized with other sequencing protocol, for genotyping, or in other chemical and/or biological applications.

While the examples described in FIG. 1A through FIG. 1E and FIG. 2 illustrate the use of the example resin compositions 10 in the formation of a flow cell surface, it is to be understood that the resin compositions 10 disclosed herein may be used in other applications where low autofluorescence is desired. As one example, the resin composition 10, 10' may be used in any optically-based sequencing technique. As other examples, the resin composition 10, 10' may be used in planar waveguides, in complementary metal-oxide semiconductors (CMOS), etc.

To further illustrate the present disclosure, examples are given herein. It is to be understood that these examples are provided for illustrative purposes and are not to be construed as limiting the scope of the present disclosure.

NON-LIMITING WORKING EXAMPLES

Several example resins, comparative example resins, and control examples were prepared and analyzed as described in more detail in each of the following examples.

The autofluorescence was measured with a rig equipped with violet, blue and green channels. The laser power measured at the sample varied between 170 mW and 400 mW, the numerical aperture (NA) of the objective lens ranges between 0.13-0.50, and the slit size ranged between 10 μm and 200 μm. The excitation and the collection wavelengths of the three channels of the AF rig are shown in Table 1.

TABLE 1

| Color | Excitation/nm | Collection/nm |
|---|---|---|
| violet | 405 | 418-450 |
| blue | 457 | 482-525 |
| green | 532 | 575-625 |

The efficiency of the UV curing was determined for some examples using FTIR (Fourier-transform infrared spectroscopy).

The follow abbreviations are used in one or more of the examples:

2,4,6,8-tetramethyl-2,4,6,8-tetrakis[3-acryloyloxypropyl] cyclotetrasiloxane: AD4 pentaerythritol tetraacrylate: PE4A
glycerol 1,3-diglycerolate diacrylate: GD2A
pentaerythritol triacrylate: PE3A
glycerol dimethacrylate, mixture of isomers: GD2MA
trimethylpropane triacrylate: TMP3A
3-(acryloyloxy)-2-hydroxypropyl methacrylate: HPMMA
propylene glycol methyl ether acetate: PGMEA
Azobisiso-butyronitrile: AIBN
2,2'-azobis(2,4-dimethylvaleronitrile): V65B
2,2-dimethoxy-2-phenylacetophenone: DPA
2-hydroxy-2-methylpriophenone: HMPP
diphenyl(2,4,6-trimethylbenzoyl)phosphine oxide: DPBAPO
phenylbis(2,4,6-trimethylbenzoyl)phosphine oxide: TMBAPO
pentabromobenzyl acrylate: BPPA
epoxycyclohexyl tetramethylcyclotetra siloxane: EC-D4
glycidyl cyclotetrasiloxane: G-D4
bis-(4-methylphenyl)iodonium hexafluorophosphate: IPF
tris(4-((4-acetylphenyl)thio)phenyl)-sulfonium tetrakis(perfluoro-phenyl)borate: PAG290
4-cyano-4-(phenylcarbonothioylthio)pentanoic acid: RAFT-1 ethyl pyruvate: EP
bis[4-(tert-butyl)phenyl]iodonium tetra(nonafluoro-tert-butoxy)aluminate: PITA
1,1,2,2-tetraphenyl-1,2-ethanediol: TPED
Fully Functional Cytosine: FFC
Fully Functional Adenine: FFA
Fully Funtional Thymine: FFT

Example 1—Initiator Free (Meth)Acrylates

Two example (meth)acrylate-based resins (Ex. Resin 1 and Ex. Resin 2) and one comparative example resin (Comp. Ex. Resin 3) were prepared. The resin compositions are provided in Table 2 below.

TABLE 2

| Ingredient Type | Specific Ingredient | Ex. Resin 1 (mass % of total solids) | Ex. Resin 2 (mass % of total solids) | Comp. Ex. Resin 3 (mass % of total solids) |
|---|---|---|---|---|
| (meth)acrylate cyclosiloxane monomer | AD4 | 49.2 | 49.2 | — |
| non-siloxane (meth)acrylate based monomer | GD2A | — | 49.2 | — |
| | PE4A | 49.2 | — | — |
| Epoxy monomer | epoxy polyhedral oligomeric silsesquioxane | — | — | 92.4 |
| Initiator | PAG 290 | — | — | 1.0 |
| | IPF | — | — | 5.0 |
| Surface Additive | BYK ®-350 | 1.6 | 1.6 | 1.6 |
| Solvent | PGMEA | Added to achieve about 17% solids | Added to achieve about 17% solids | Added to achieve about 18% solids |

Glass wafers were used as the substrates in this example. One bare (untreated and uncoated) glass wafer was used as a control example.

The rest of the glass wafers were pre-treated with an adhesion promoting silane coupling agent. The adhesion promoter was spin-coated from a 25 mass % solution in PGMEA onto glass wafers. A post-coating heat treatment (at 130° C. for 2 minutes) silanized the glass surfaces.

Each of the resin compositions (Ex. Resin 1, Ex. Resin 2, and Comp. Ex. Resin 3) were spin coated on the silanized glass wafers. A working stamp was hand rolled on each of the coated glass wafers. The working stamp had a center-to-center pitch of 624 nm. The resin compositions were then exposed to UV curing under a 365 nm UV LED light source with a 330 mW/$cm^2$ power output measured at the sample level. Curing was performed for 30 seconds. After curing, the working stamp was released and a hardbake was performed for about 2 minutes at a temperature of about 200° C.

Each of Ex. Resin 1, Ex. Resin 2, and Comp. Ex. Resin 3 was imprintable.

Figure 3:
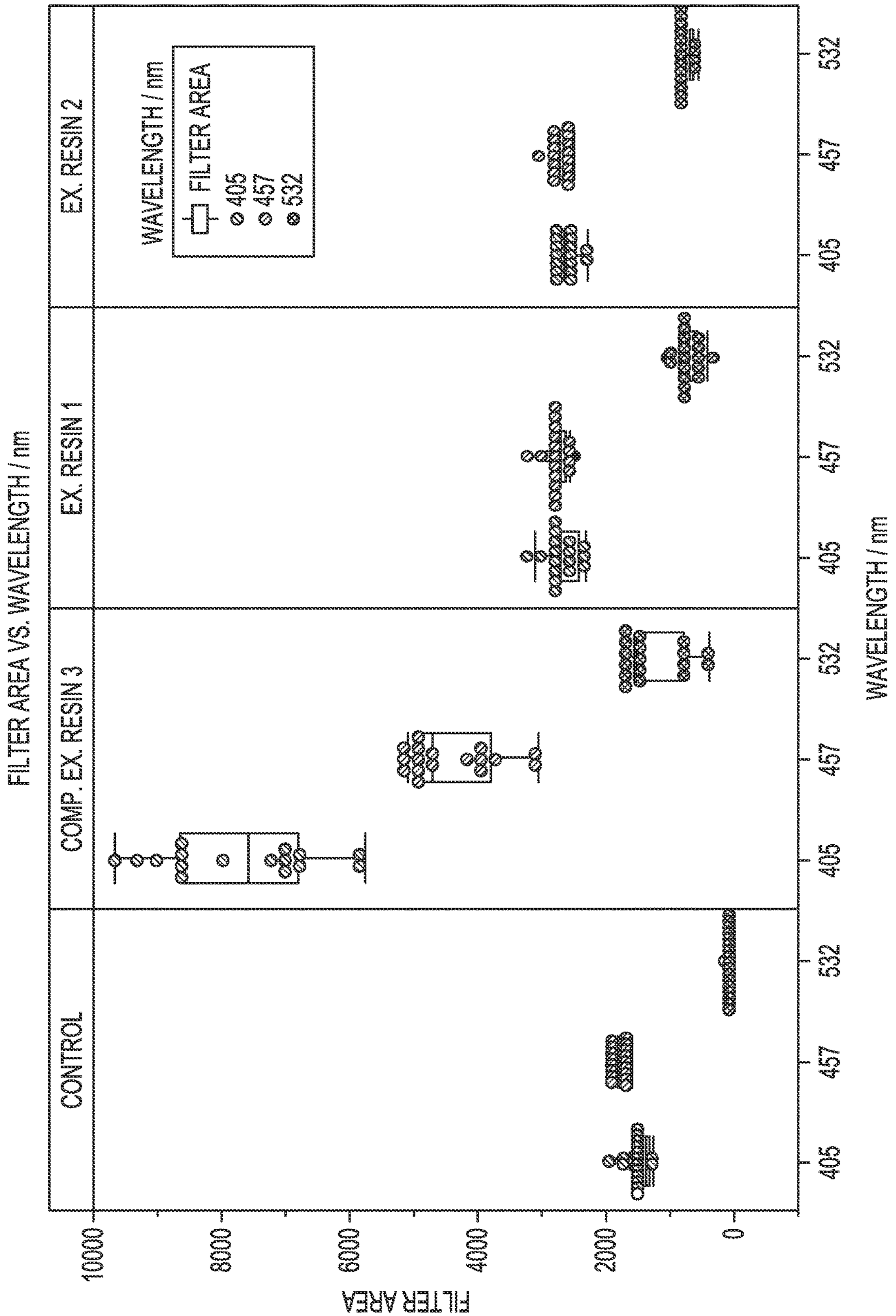
FIG. 3 is a graph depicting the autofluorescence data (in violet, blue, and green channels), in terms of FilterArea (integrated fluorescence intensity (AU) using a selected collection band, Y axis) versus excitation wavelength (nm, X axis), for a control example, a cured comparative example resin, and two cured initiator free (meth)acrylate based example resins.

The autofluorescence of the imprints generated using Ex. Resin 1, Ex. Resin 2, and Comp. Ex. Resin 3 was measured with the rig described above for each of the violet, blue and green channels. The control example was also tested for comparison. The results are shown in FIG. 3 (depicting FilterArea versus the channel wavelength (nm)). In the respective violet (405 nm), blue (457 nm), and green (532 nm) channels, Ex. Resin 1 and Ex. Resin 2 exhibited slightly higher autofluorescence than the control example and much lower autofluorescence than Comp. Ex. Resin 3.

Example 2—Azo-Initiator (Meth)Acrylates

Three example (meth)acrylate-based resins (Ex. Resin 4-Ex. Resin 6) were prepared. One comparative example resin (Comp. Ex. Resin 7) having the same formulation as Comp. Ex. Resin 3 from Example 1 was also prepared. Ex. Resins 4 and 5 were prepared with azo-initiators, and Ex. Resin 6 was similar to Ex. Resin 5 without the initiator (and thus was similar to the initiator free resins of Example 1). The example resin compositions are provided in Table 3 below.

TABLE 3

| Ingredient Type | Specific Ingredient | Ex. Resin 4 (mass % of total solids) | Ex. Resin 5 (mass % of total solids) | Ex. Resin 6 (mass % of total solids) |
|---|---|---|---|---|
| (meth)acrylate cyclosiloxane monomer | AD4 | 48.2 | 48.2 | 49.2 |
| non-siloxane (meth)acrylate based monomer | PE3A | | 48.2 | 49.2 |
| | PE4A | 48.2 | | |
| Azo-initiator | AIBN | 2.0 | | |
| | V65B | | 2.0 | |
| Surface Additive | BYKR-350 | 1.6 | 1.6 | 1.6 |
| Solvent | PGMEA | Added to achieve about 17% solids | Added to achieve about 17% solids | Added to achieve about 17% solids |

Glass wafers were used as the substrates in this example. One bare (untreated and uncoated) glass wafer was used as a control example.

The rest of the glass wafers were pre-treated with an adhesion promoting silane coupling agent. The adhesion promoter was spin-coated from a 25 mass % solution in PGMEA onto glass wafers. A post-coating heat treatment (at 130° C. for 2 minutes) silanized the glass surfaces.

Some of the resin compositions (Ex. Resin 4 and Comp. Ex. Resin 7) were spin coated on the silanized glass wafers. A working stamp was hand rolled on each of the coated glass wafers. The working stamp had a center-to-center pitch of 624 nm or 350 nm. The resin compositions were then exposed to UV curing under a 365 nm UV LED light source with a 330 mW/cm$^2$ power output measured at the sample level. Curing was performed for 30 seconds. After curing, the working stamp was released and a hardbake was performed for about 2 minutes at a temperature of about 200° C.

Each of Ex. Resin 4 and Comp. Ex. Resin 7 was imprintable.

Figure 4:
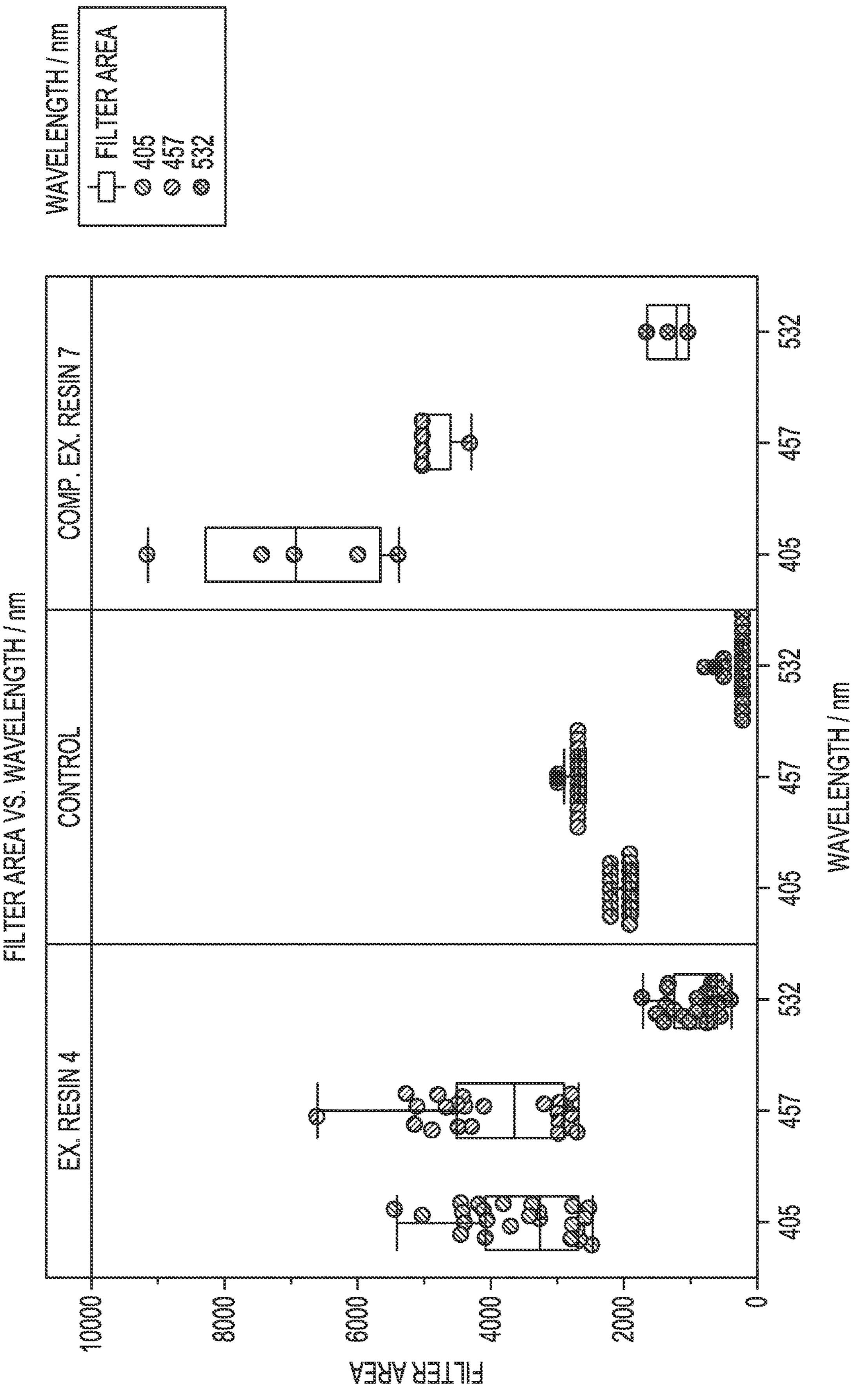
FIG. 4 is a graph depicting the autofluorescence data (in violet, blue, and green channels), in terms of FilterArea (integrated fluorescence intensity (AU) using a selected collection band, Y axis) versus excitation wavelength (nm, X axis), for a control example, a cured comparative example resin, and a cured (meth)acrylate based example resin containing an azo-initiator.

The autofluorescence of the imprints generated using Ex. Resin 4 and Comp. Ex. Resin 7 was measured with the rig described above for each of the violet, blue and green channels. The control example was also tested for comparison. The results are shown in FIG. 4 (depicting FilterArea versus the channel wavelength (nm)). In the respective violet (405 nm), blue (457 nm), and green (532 nm) channels, Ex. Resin 4 exhibited slightly higher autofluorescence than the control example and generally lower autofluorescence than Comp. Ex. Resin 7.

The other resin compositions (Ex. Resin 5 and Ex. Resin 6) were spin coated on the silanized glass wafers. A working stamp was hand rolled on each of the coated glass wafers. The working stamp had a center-to-center pitch of 624 nm or 350 nm. The resin compositions were then exposed to UV curing under a 365 nm UV LED light source with a 330 mW/cm$^2$ power output measured at the sample level. Curing was performed for 10 seconds. After curing, the working stamp was released and a hardbake was performed for about 2 minutes at a temperature of about 200° C.

Each of Ex. Resin 5 and Ex. Resin 6 was imprintable.

Figure 5A:
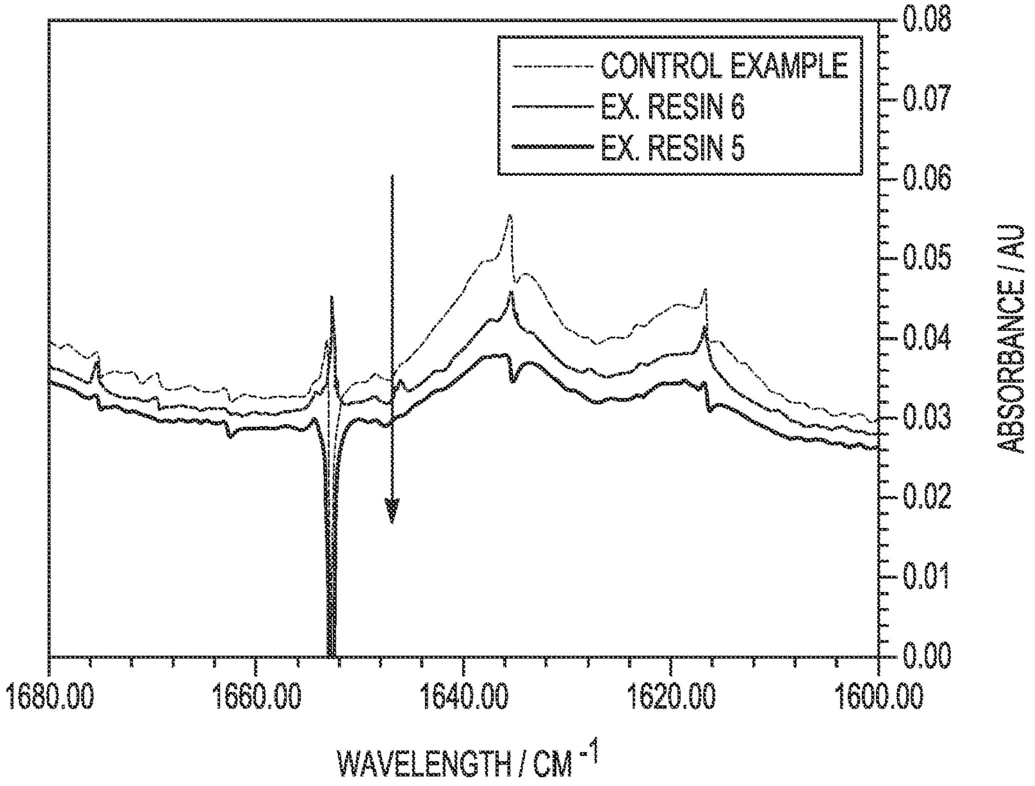
FIG. 5A and FIG. 5B are graphs depicting the Fourier-transform infrared spectroscopy (FTIR) intensity at 1636 $cm^{-1}$ ($CH_2$═CH—R stretching) (FIG. 5A) and 1406 $cm^{-1}$ (C═C—H in-plane deformation) (FIG. 5B) for a control example, a cured initiator free (meth)acrylate based example resin, and a cured (meth)acrylate based example resin containing an azo-initiator.
Figure 5B:
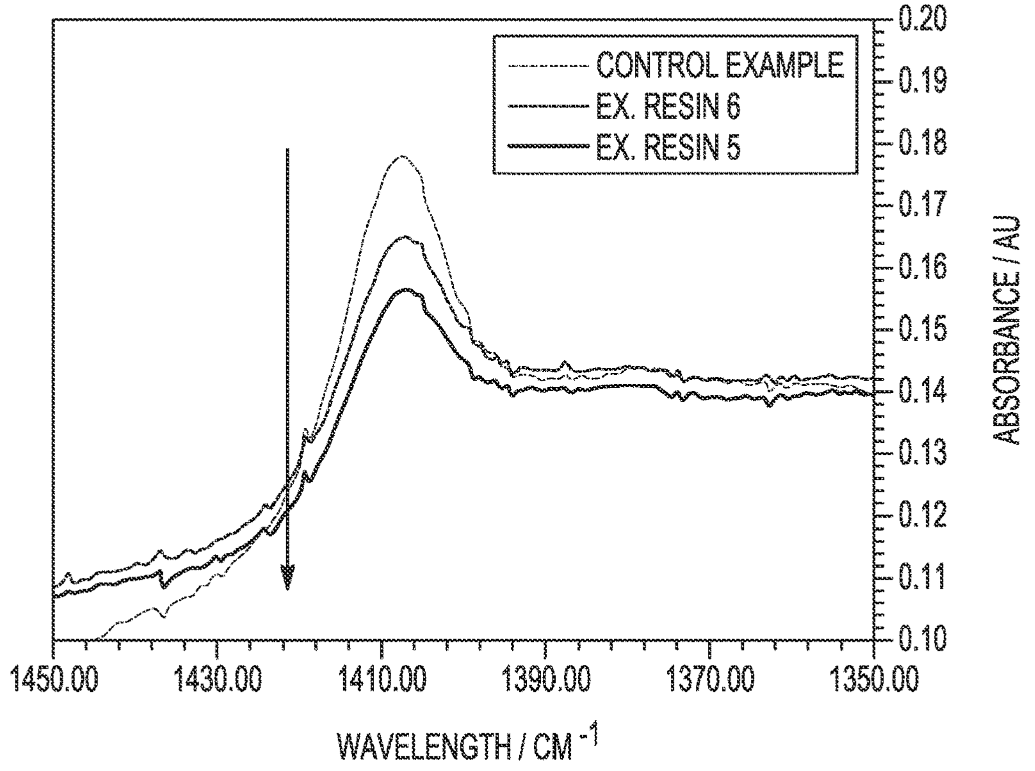

FTIR spectra of the imprints generated with Ex. Resin 5 (with azo-initiator) and Ex. Resin 6 (without azo-initiator) and of the control example were recorded. These results are shown in FIG. 5A (1406 cm$^{-1}$, C═C—H in-plane deformation) and FIG. 5B (1636 cm$^{-1}$, $CH_2$═CH—R stretching). The intensity decrease of the peaks at 1636 cm$^{-1}$ and 1406 cm$^{-1}$ was used to monitor the extent of UV curing. As shown in both FIG. 5A and FIG. 5B, Ex. Resin 6 (without the azo-initiator) exhibited an increased extent of cure relative to the control example, and Ex. Resin 5 (with the azo-initiator) exhibited an increased extent of cure relative to Ex. Resin 6. These results illustrate that the initiator free (meth) acrylate resin compositions, both without and with the azo-initiator, increase the extent of cure.

Example 3—Acetophenone, Phosphine Oxide, Brominated Aromatic Acrylate, and Dithiocarbamate Initiator (Meth)Acrylates Several example (meth)acrylate-based resins were prepared. Five (Ex. Resin 8-Ex. Resin 12) of the example resins had the same (meth)acrylate monomers and different initiators. These compositions are provided in Table 4 below. Six additional example resins (Ex. Resin 13-Ex. Resin 18) had the different (meth)acrylate monomers and the same initiator. These compositions are provided in Table 5 below. Two comparative example resins (Comp. Ex. Resin 19 and Comp. Ex. Resin 20) were also prepared with the same formulation as Comp. Ex. Resin 3 from Example 1.

TABLE 4

| Ingredient Type | Specific Ingredient | Ex. Resin 8 (mass % of total solids) | Ex. Resin 9 (mass % of total solids) | Ex. Resin 10 (mass % of total solids) | Ex. Resin 11 (mass % of total solids) | Ex. Resin 12 (mass % of total solids) |
|---|---|---|---|---|---|---|
| (meth)acrylate cyclosiloxane monomer | AD4 | 48.2 | 48.2 | 48.2 | 48.2 | 48.2 |
| non-siloxane (meth)acrylate based monomer | PE3A | 48.2 | 48.2 | 48.2 | 48.2 | 48.2 |
| Acetophenone | DPA | — | — | — | — | 2.0 |
| Initiator | HMPP | — | 2.0 | — | — | — |
| Phosphine | DPBAPO | 2.0 | — | — | — | — |

TABLE 4-continued

| Ingredient Type | Specific Ingredient | Ex. Resin 8 (mass % of total solids) | Ex. Resin 9 (mass % of total solids) | Ex. Resin 10 (mass % of total solids) | Ex. Resin 11 (mass % of total solids) | Ex. Resin 12 (mass % of total solids) |
|---|---|---|---|---|---|---|
| Oxide Initiator | TMBAPO | — | — | — | 2.0 | — |
| Brominated aromatic acrylate | BPPA | — | — | 2.0 | — | — |
| Surface Additive | BYK ®-350 | 1.6 | 1.6 | 1.6 | 1.6 | 1.6 |
| Solvent | PGMEA | Added to achieve about 17% solids | Added to achieve about 17% solids | Added to achieve about 17% solids | Added to achieve about 17% solids | Added to achieve about 17% solids |

TABLE 5

| Ingredient Type | Specific Ingredient | Ex. Resin 13 (mass % of total solids) | Ex. Resin 14 (mass % of total solids) | Ex. Resin 15 (mass % of total solids) | Ex. Resin 16 (mass % of total solids) | Ex. Resin 17 (mass % of total solids) | Ex. Resin 18 (mass % of total solids) |
|---|---|---|---|---|---|---|---|
| (meth)acrylate cyclosiloxane monomer | AD4 | 48.2 | 48.2 | 48.2 | 48.2 | 48.2 | 48.2 |
| non-siloxane | PE3A | 48.2 | — | — | — | — | — |
| (meth)acrylate | GD2A | — | 48.2 | | — | — | — |
| based | PE4A | — | — | 48.2 | — | — | — |
| monomer | TMP3A | — | — | — | 48.2 | — | — |
| | GD2MA | — | — | — | — | 48.2 | — |
| | HPMMA | — | — | — | — | — | 48.2 |
| Phosphine Oxide Initiator | DPBAPO | 2.0 | 2.0 | 2.0 | 2.0 | 2.0 | 2.0 |
| Surface Additive | BYK ®-350 | 1.6 | 1.6 | 1.6 | 1.6 | 1.6 | 1.6 |
| Solvent | PGMEA | Added to achieve about 17% solids | Added to achieve about 17% solids | Added to achieve about 17% solids | Added to achieve about 17% solids | Added to achieve about 17% solids | Added to achieve about 17% solids |

Glass wafers were used as the substrates in this example. One bare (untreated and uncoated) glass wafer was used as a control example.

The rest of the glass wafers were pre-treated with an adhesion promoting silane coupling agent. The adhesion promoter was spin-coated from a 25 mass % solution in PGMEA onto glass wafers. A post-coating heat treatment (at 130° C. for 2 minutes) silanized the glass surfaces.

All of the resin compositions (Ex. Resin 8-Ex. Resin 18 and Comp. Ex. Resin 19) were spin coated on the silanized glass wafers. A working stamp was hand rolled on each of the coated glass wafers. The working stamp had a center-to-center pitch of 624 nm or 350 nm. The resin compositions were then exposed to UV curing under a 365 nm UV LED light source with a 330 mW/cm$^2$ power output measured at the sample level. Curing was performed for 30 seconds. After curing, the working stamp was released and a hard-bake was performed for about 2 minutes at a temperature of about 200° C.

Each of Ex. Resin 8-Ex. Resin 18 and Comp. Ex. Resin 19 was imprintable.

Figure 6:
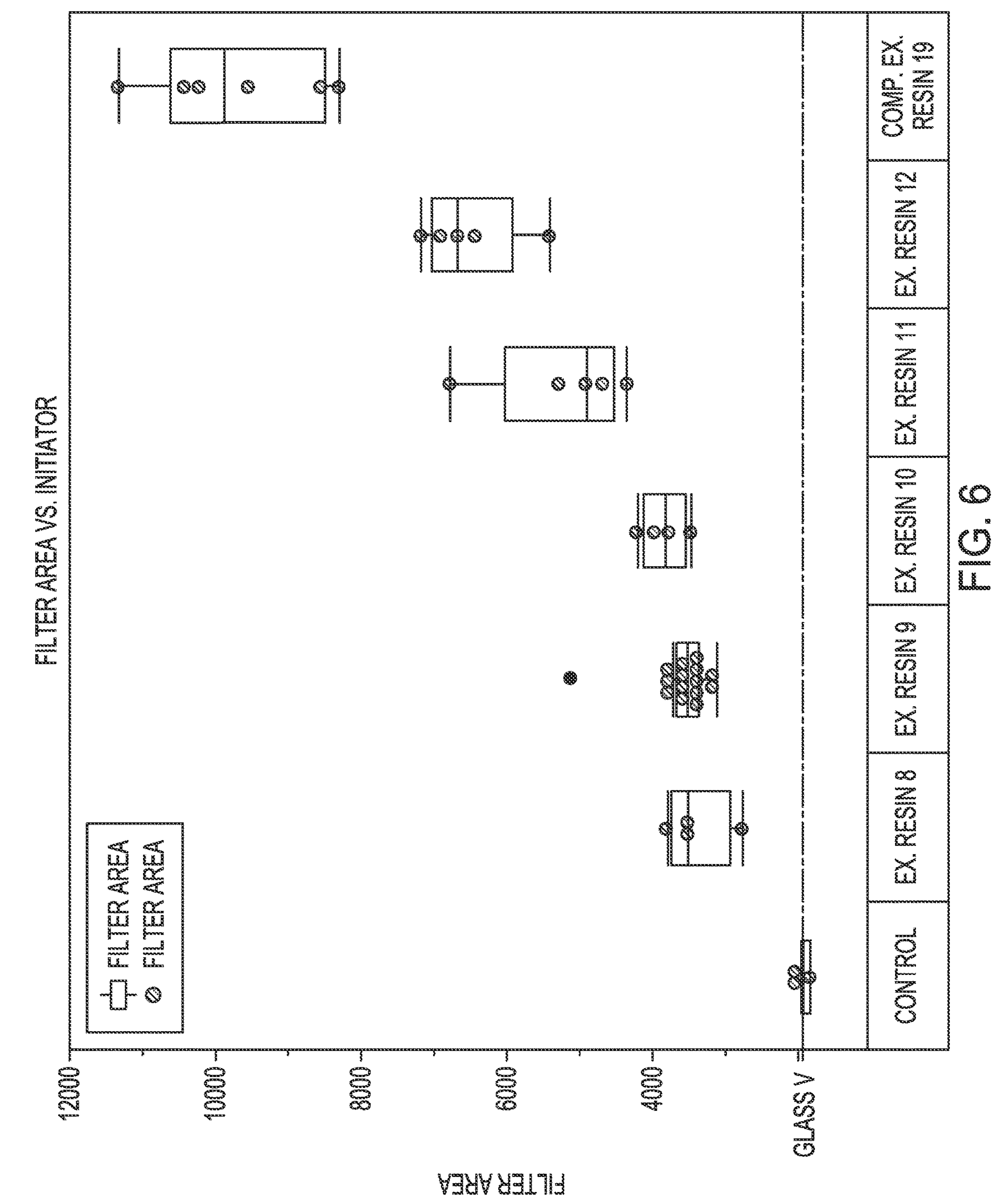
FIG. 6 is a graph depicting the autofluorescence data (in the violet channel), in terms of FilterArea (integrated fluorescence intensity (AU) using a selected collection band, Y axis) at the 405 nm excitation wavelength, for a control example, a cured comparative example resin, and cured (meth)acrylate based example resins containing different initiators.

The autofluorescence of the imprints generated using Ex. Resin 8-Ex. Resin 12 (with different initiators) and Comp. Ex. Resin 19 was measured with the rig described above for the violet (405 nm) channel. The control example was also tested for comparison. The results are shown in FIG. 6 (depicting the FilterArea for each of the resins). In the violet (405 nm) channel, Ex. Resin 8 through Ex. Resin 12 exhibited higher autofluorescence than the control example and significantly lower autofluorescence than Comp. Ex. Resin 19.

Figure 7:
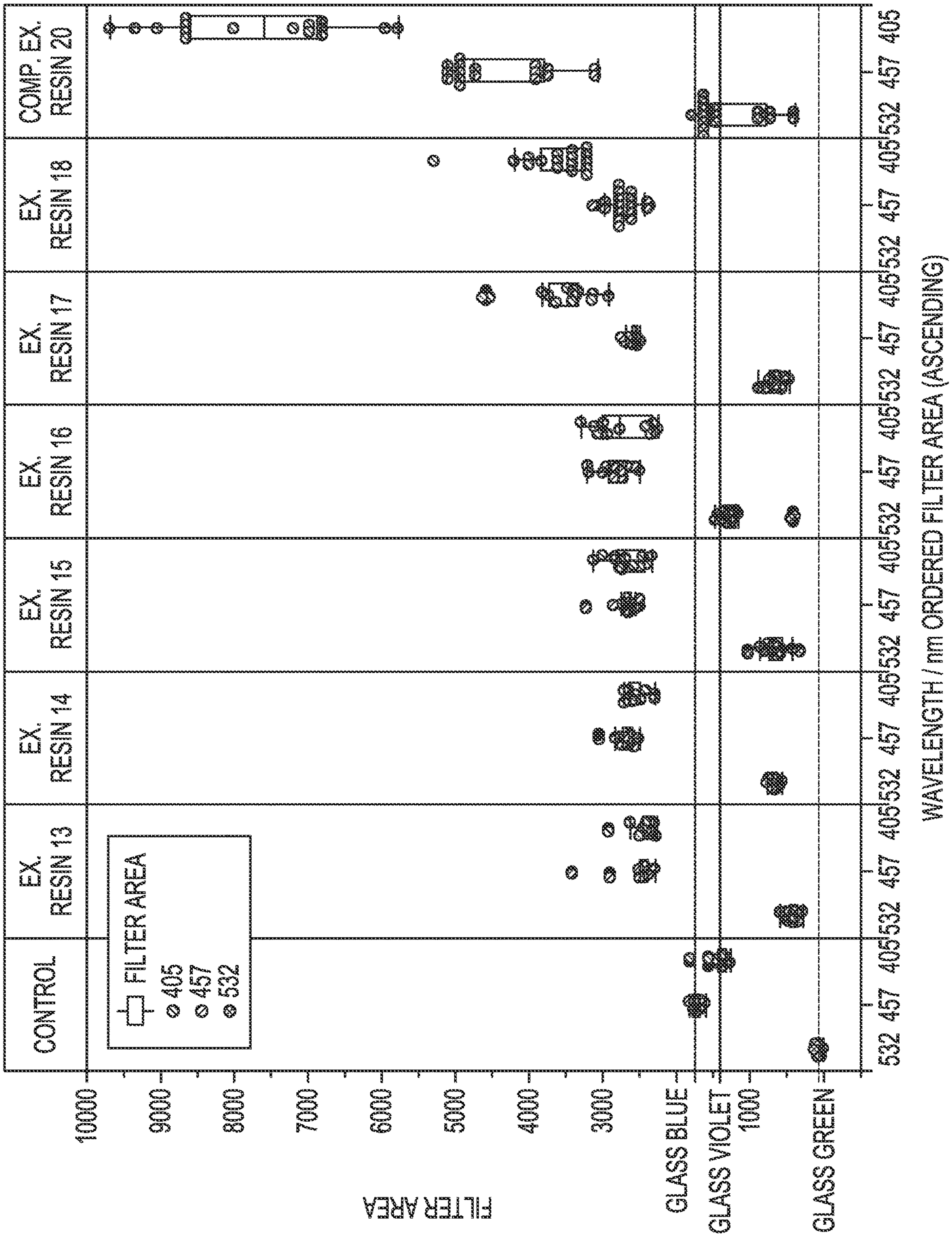
FIG. 7 is a graph depicting the autofluorescence data (in violet, blue, and green channels), in terms of FilterArea (integrated fluorescence intensity (AU) using a selected collection band, Y axis) versus excitation wavelength (nm, X axis), for a control example, a cured comparative example resin, and cured (meth)acrylate based example resins containing different (meth)acrylate monomers and the same initiator.

The autofluorescence of the imprints generated using Ex. Resin 13-Ex. Resin 18 and Comp. Ex. Resin 20 was measured with the rig described above for each of the violet (405 nm), blue (457 nm), and green (532 nm) channels. The control example was also tested for comparison. The results are shown in FIG. 7 (depicting FilterArea versus the channel wavelength (nm)). In the respective violet (405 nm) and blue (457 nm) channels, Ex. Resin 13 through Ex. Resin 18 exhibited slightly higher autofluorescence than the control example and significantly lower autofluorescence than Comp. Ex. Resin 20. The results in FIG. 7 also demonstrate that the autofluorescence also depends, in part, on the choice of the non-siloxane (meth)acrylate based monomer.

Figure 8:
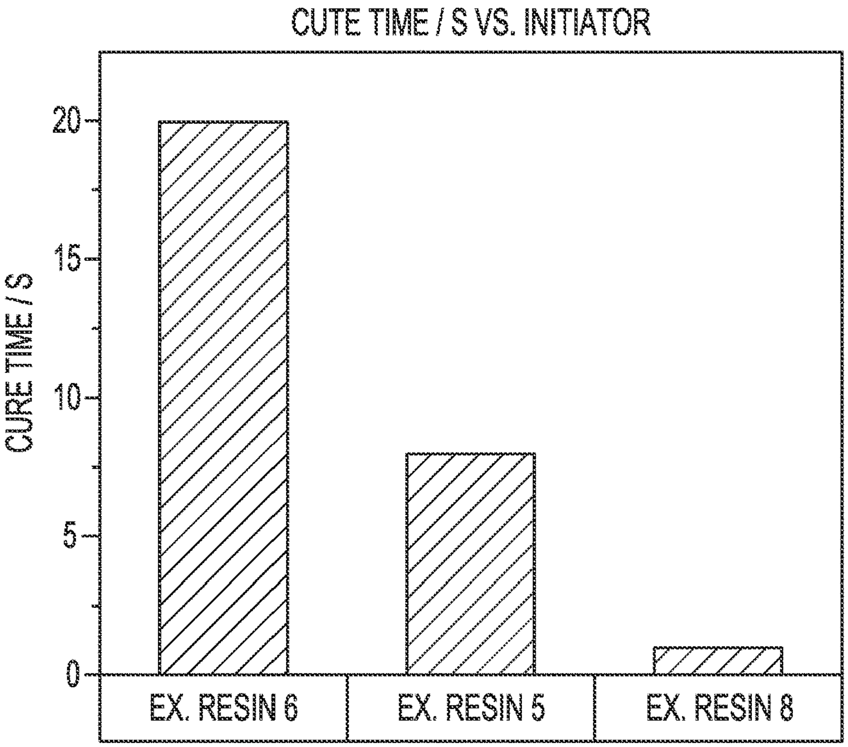
FIG. 8 is a graph depicting the cure time (seconds, Y axis) for a cured initiator free (meth)acrylate based example resin, a cured (meth)acrylate based example resin containing an azo-initiator, and cured (meth)acrylate based example resin containing a phosphine oxide initiator.

Example 4—Comparison of Initiator Free, Azo Initiator, and Phosphine Oxide Dithiocarbamate Initiator (Meth)Acrylates The curing time for Ex. Resin 6 (Example 2, initiator free), Ex. Resin 5 (Example 2, azo-initiator), and Ex. Resin 8 (Example 3, phosphine oxide initiator) were compared because each of these resins was prepared with the same 1:1 mass ratio of AD4:PE3A. The results are shown in FIG. 8. Without any initiator, the Ex. Resin 6 cured in about 20 seconds. The initiators significantly decreased the curing time to about 2.5 seconds with the phosphine oxide initiator (Ex. Resin 8) and to about 7.5 seconds with the azo-initiator (Ex. Resin 5). The results in FIG. 8 were based upon visual observation and supporting FTIR data.

Example 5—Epoxy Resins

Five example epoxy-based resin compositions were prepared. Each of these resin compositions (Ex. Resin 20-Ex. Resin 24) was prepared with the same combination of epoxy monomers and different initiators. These compositions are provided in Table 6 below. A comparative example resins (Comp. Ex. Resin 25) was also prepared with the same formulation as Comp. Ex. Resin 3 from Example 1.

TABLE 6

| Ingredient Type | Specific Ingredient | Ex. Resin 20 (mass % of total solids) | Ex. Resin 21 (mass % of total solids) | Ex. Resin 22 (mass % of total solids) | Ex. Resin 23 (mass % of total solids) | Ex. Resin 24 (mass % of total solids) |
|---|---|---|---|---|---|---|
| first epoxy cyclosiloxane | EC-D4 | 46.6 | 46.2 | 33.7-45.2 | 33.7-45.2 | 33.7-45.2 |
| second epoxy cyclosiloxane | G-D4 | 46.6 | 46.2 | 33.7-45.2 | 33.7-45.2 | 33.7-45.2 |
| First Initiator | IPF | 5.0 | 5.0 | 5.0 | 5.0 | 5.0 |
| Second Initiator | PAG290 | 0.2 | 1.0 | — | — | — |
| | EP | — | — | 3.0-26.0 | — | — |
| | PITA | — | — | — | 3.0-26.0 | — |
| | TPED | — | — | — | — | 3.0-26.0 |
| Surface Additive | BYK ®-350 | 1.6 | 1.6 | 1.6 | 1.6 | 1.6 |
| Solvent | PGMEA | Added to achieve about 17% solids | Added to achieve about 17% solids | Added to achieve about 17% solids | Added to achieve about 17% solids | Added to achieve about 17% solids |

Glass wafers were used as the substrates in this example. One bare (untreated and uncoated) glass wafer was used as a control example.

All of the resin compositions (Ex. Resin 20-Ex. Resin 24 and Comp. Ex. Resin 25) were spin coated on the silanized glass wafers. A softbake was performed for about 2 minutes at 130° C. or for about 30 seconds at 90° C. A working stamp was hand rolled on each of the coated glass wafers. The working stamp had a center-to-center pitch of 624 nm or 350 nm. The resin compositions were then exposed to UV curing under a 365 nm UV LED light source with a 330 $mW/cm^2$ power output measured at the sample level. Curing was performed for 4 seconds (Ex. Resin 21), or for 8 seconds (Comp. Ex. Resin 25), or for 16 seconds (Ex. Resin 20), or for 60 seconds (Ex. Resin 22-Ex. Resin 24). After curing, the working stamp was released.

Each of Ex. Resin 20-Ex. Resin 24 and Comp. Ex. Resin 25 was imprintable.

Figure 9:
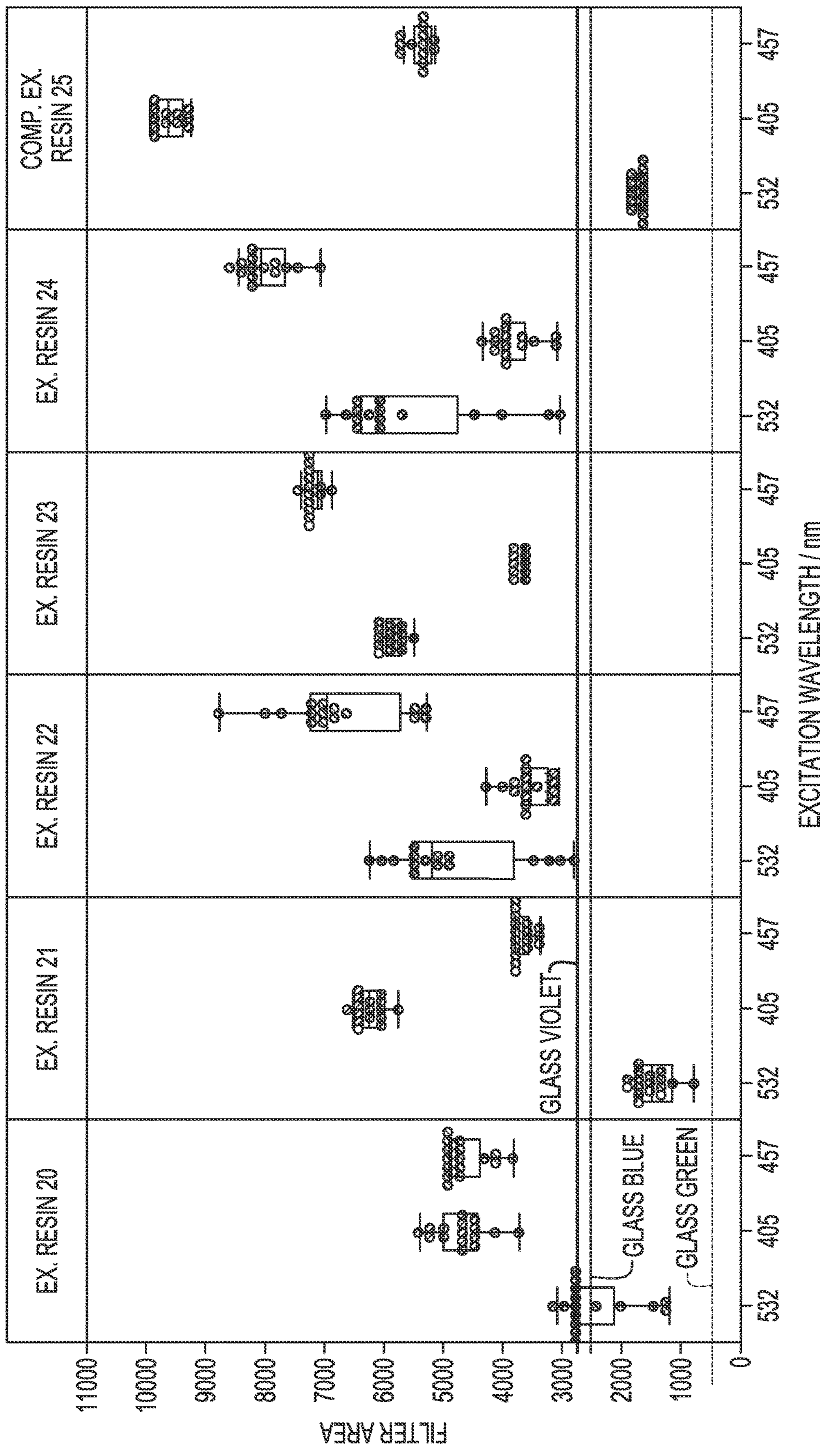
FIG. 9 is a graph depicting the autofluorescence data (in violet, blue, and green channels), in terms of FilterArea (integrated fluorescence intensity (AU) using a selected collection band, Y axis) versus excitation wavelength (nm, X axis), for a control example, a cured comparative example resin, and cured epoxy based example resins containing different initiator combinations.

The autofluorescence of the imprints generated using Ex. Resin 20-Ex. Resin 24 (with different initiators) and Comp. Ex. Resin 25 was measured with the rig described above for each of the violet (405 nm), blue (457 nm), and green (532 nm) channels. The results are shown in FIG. 9 (depicting FilterArea versus the channel wavelength (nm)). In the respective violet (405 nm) channel, Ex. Resin 20 through Ex. Resin 24 exhibited significantly lower autofluorescence than Comp. Ex. Resin 25. In the blue (457 nm) channel, Ex. Resin 20 and Ex. Resin 21 (with PAG290 as the second initiator) exhibited slightly lower autofluorescence than Comp. Ex. Resin 25.

Figure 10:
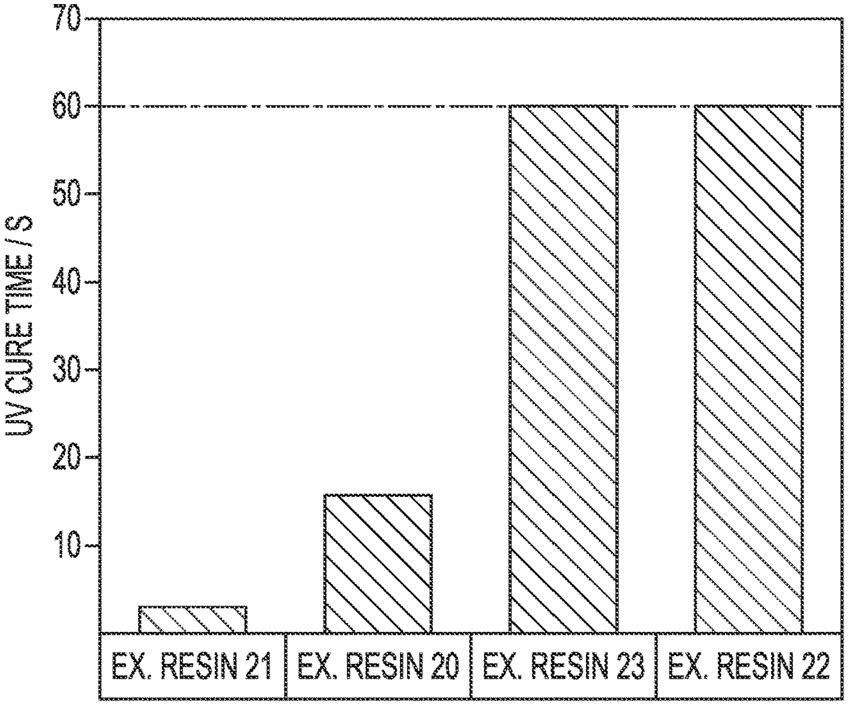
FIG. 10 is a graph depicting the cure time (seconds, Y axis) for some of the cured epoxy based example resins containing different initiator combinations.

The curing time for Ex. Resin 20 through Ex. Resin 22 were compared. The results are shown in FIG. 10. Ex. Resins 20 and 21, including the combination of the IPF and PAG290 initiators, exhibited desirably quick curing times of about 16 seconds and 4 seconds, respectively. While the curing time of Ex. Resins 22 and 23 was not quite as fast, they both exhibited cure times of 60 seconds.

Figure 11:
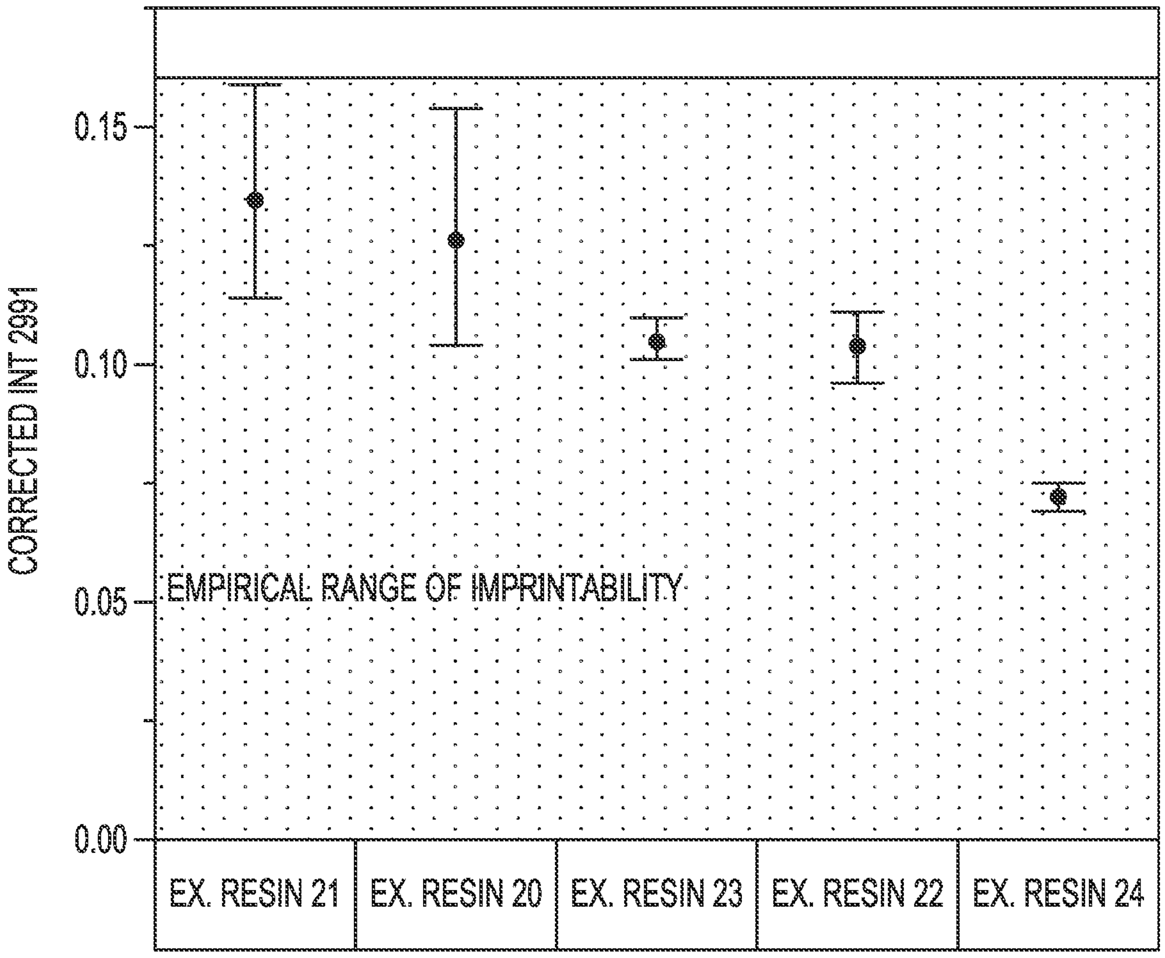
FIG. 11 is a graph depicting the corrected infrared (IR) intensity at 2991 cm-1 (Y axis) for cured epoxy based example resins containing different initiator combinations.

FTIR spectra were measured for each of the epoxy resins (Ex. Resin 20-Ex. Resin 24). To assess the extent of cure, the intensity of a peak corresponding to the C—H tension in an unopened epoxy ring at 2991 $cm^{-1}$ was normalized with respect to a reference peak at 2925-2927 $cm^{-1}$ (denoted as corrected Int2991). A lower intensity of this peak corresponded to a higher extent of cure. FIG. 11 depicts the results. The highlighted area depicts the empirical range of the desired extent of cure to obtain a sufficiently crosslinked resin with a high-quality, non-reflowing imprint. Each of the example resins falls within the empirical range, thus confirming the high quality of the imprints.

Example 6—Sequencing

Non-patterned glass dies were respectively coated with Ex. Resin 22 (epoxy-based resin from Example 5), Ex. Resin 8 ((meth)acrylate-based resin from Example 3), and Comp. Ex. Resin 3 (from Example 1). Each of the resin compositions was cured for 60 seconds. A blank glass die was used as the control example.

All of the dies were ashed in air plasma at 595 W RF power for about 30 seconds. The surface-activated dies were silanized using [(5-bicyclo[2.2.1]hept-2-enyl)ethyl] trimethoxysilane in the neat chemical's vapor overnight at 60° C. The dies were bonded to cover slips having engraved fluidic channels using an adhesive, which was UV cured for 9 minutes under a UV lamp with wide spectral emission and a power output of 3 mW measured at the sample level.

The silanized dies in the bonded flow cells were fluidically coated with a 0.175 mass % N,N-dimethyl-acrylamide aqueous solution, which was incubated for 75 minutes at 70° C. to generate a hydrogel layer. DNA oligomers (P5 and P7 primers) were grafted onto the hydrogel layer from an 18 μM aqueous solution, which was incubated at 60° C. for 30 minutes.

A 0.67 pM PhiX library was used as a DNA template. Cluster generation was performed using Illumina's MiSeq™ reagents.

12 cycles of sequencing by synthesis (SBS) were performed with an incorporation mix that included fully functional oligonucleotides (unlabeled G, FFC-blue dye label, FFC-violet dye label, FFT violet dye label, FFA green dye label, FFA blue dye label (with two different dyes being used for the flow cell including Ex. Resin 22 and the flow cell including Ex. Resin 8), some of which included dye labels for violet/blue sequencing. In the 13th cycle, the fluorescent dyes were removed from the 3' blocking group. The 14th cycle consisted of an extra washing step by flushing through the flow cell with an incorporation mix containing no fully functional nucleotides. Finally, in the 15th cycle, the complementary strands were dehybridized from the clusters. Cycles 13-15 were included as control runs to verify if the fully functional oligonucleotides were bound the substrate in off-cluster areas.

Illumina's MiSeq™ was used for sequencing. The optic settings of the MiSeq™ instrument are shown in Table 7.

TABLE 7

| channel | Excitation wavelength/nm | Collection wavelength/nm | Irradiance/ W $cm^{-2}$ | Exposure time/ms |
|---|---|---|---|---|
| violet | 402 | 418-447.5 | 71 | 500 |
| blue | 464 | 482-520 | 236 | 300 |

The sequencing data collected included density (K/$mm^2$), passing filter (% PF) (percentage), and the percentage of Qscores that were greater than Q30. Density is the number of clusters generated per unit area of the flow cell surface. Passing filter (PF) is the metric used to describe clusters which pass a chastity threshold and are used for further processing and analysis of sequencing data. A higher % passing filter result indicates an increased yield of unique clusters used for sequencing data. A Qscore of 30 (Q30) is equivalent to the probability of an incorrect base call 1 in 1000 times. This means that the base call accuracy (i.e., the probability of a correct base call) is 99.9%. A lower base call accuracy of 99% (Q20) will have an incorrect base call probability of 1 in 100, meaning that every 100 base pair sequencing read will likely contain an error. When sequencing quality reaches Q30, virtually all of the reads will be perfect, having 99.9% accuracy.

The sequencing data from the twelve sequencing run for each flow cell is reproduced in Table 8.

TABLE 8

| Flow Cell ID | Resin | Density (K/$mm^2$) | Clusters PF (%) | % ≤ 30 |
|---|---|---|---|---|
| Ex. A | Ex. Resin 22 (epoxy-based) | 247 ± 12 | 41.87 ± 9.09 | 50.74 |
| Ex. B | Ex. Resin 8 ((meth)acrylate based) | 243 ± 29 | 46.78 ± 12.82 | 68.96 |
| Comp. C | Comp. Resin 3 | 247 ± 9 | 46.87 ± 3.66 | 62.47 |
| Control | None | 195 ± 5 | 32.26 ± 8.88 | 64.40 |

The sequencing data for the example flow cells Ex. A and Ex. B demonstrate that the (meth)acrylate and epoxy based resins disclosed herein are compatible with violet/blue sequencing.

ADDITIONAL NOTES

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

While several examples have been described in detail, it is to be understood that the disclosed examples may be modified. Therefore, the foregoing description is to be considered non-limiting.

What is claimed is:

1. An ultraviolet light or thermally curable resin composition, consisting of:

a predetermined mass ratio of a (meth)acrylate cyclosiloxane monomer and a non-siloxane (meth)acrylate based monomer ranging from about >0: <100 to about 80:20, wherein:

the (meth)acrylate cyclosiloxane monomer is 2,4,6,8-tetramethyl-2,4,6,8-tetrakis [3-acryloyloxypropyl] cyclotetrasiloxane; and the non-siloxane (meth)acrylate based monomer is selected from the group consisting of glycerol dimethacrylate, mixture of isomers; glycerol 1,3-diglycerolate diacrylate; pentaerythritol triacrylate; pentaerythritol tetraacrylate; bisphenol A glycerolate diacrylate; trimethylpropane triacrylate; 3-(acryloyloxy)-2-hydroxypropyl methacrylate; poly(ethylene glycol)dimethacrylate; ethylene glycol dimethacrylate; and combinations thereof;

from 0 mass % to about 10 mass %, based on a total solids content of the resin composition, of an initiator selected from the group consisting of an azo-initiator, an acetophenone, a phosphine oxide, a brominated aromatic acrylate, and a dithiocarbamate;

a surface additive; and a solvent.

2. The ultraviolet light or thermally curable resin composition as defined in claim 1, wherein:

the resin composition includes the initiator;

the initiator is the azo-initiator; and the azo-initiator is selected from the group consisting of azobisisobutyronitrile; 2,2'-azobis(2,4-dimethylvaleronitrile); 1,1'-azobis(cyclohexanecarbonitrile); 2,2'-azobis(4-methoxy-2,4-dimethylvaleronitrile); dimethyl 2,2'-azobis(2-methylpropionate); and 2,2'-Azobis(N-butyl-2-methylpropionamide.

3. The ultraviolet light or thermally curable resin composition as defined in claim 1, wherein:

the resin composition includes the initiator;

the initiator is the acetophenone; and the acetophenone is selected from the group consisting of 2,2-dimethoxy-2-phenylacetophenone and 2-hydroxy-2-methylpriophenone.

4. The ultraviolet light or thermally curable resin composition as defined in claim 1, wherein:

the resin composition includes the initiator;

the initiator is the phosphine oxide; and the phosphine oxide is selected from the group consisting of diphenyl(2,4,6-trimethylbenzoyl)phosphine oxide, phenylbis(2,4,6-trimethylbenzoyl)phosphine oxide, ethyl (2,4,6-trimethylbenzoyl)phenylphosphinate, and combinations thereof.

5. The ultraviolet light or thermally curable resin composition as defined in claim 1, wherein:

the resin composition includes the initiator;

the initiator is the brominated aromatic acrylate; and the brominated aromatic acrylate is pentabromobenzyl acrylate.

6. The ultraviolet light or thermally curable resin composition as defined in claim 1, wherein:

the resin composition includes the initiator;

the initiator is the dithiocarbamate; and the dithiocarbamate is benzyl diethyldithiocarbamate.

7. An ultraviolet light curable resin composition, comprising:

a predetermined mass ratio of a (meth)acrylate cyclosiloxane monomer and a non-siloxane (meth)acrylate based monomer ranging from about >0: <100 to about 80:20, wherein:

the (meth)acrylate cyclosiloxane monomer is 2,4,6,8-tetramethyl-2,4,6,8-tetrakis [3-acryloyloxypropyl] cyclotetrasiloxane; and the non-siloxane (meth)acrylate based monomer is selected from the group consisting of glycerol dimethacrylate, mixture of isomers; glycerol 1,3-diglycerolate diacrylate; pentaerythritol triacrylate; pentaerythritol tetraacrylate; bisphenol A glycerolate diacrylate; trimethylpropane triacrylate; 3-(acryloyloxy)-2-hydroxypropyl methacrylate; poly(ethylene glycol)dimethacrylate; and ethylene glycol dimethacrylate;

an initiator selected from the group consisting of an acetophenone, a phosphine oxide, a brominated aromatic acrylate, and a dithiocarbamate;

a surface additive; and a solvent.

8. The ultraviolet light curable resin composition as defined in claim 7, wherein:

the initiator is the acetophenone; and the acetophenone is selected from the group consisting of 2,2-dimethoxy-2-phenylacetophenone and 2-hydroxy-2-methylpriophenone.

9. The ultraviolet light curable resin composition as defined in claim 7, wherein:

the initiator is the phosphine oxide; and the phosphine oxide is selected from the group consisting of diphenyl(2,4,6-trimethylbenzoyl)phosphine oxide, phenylbis(2,4,6-trimethylbenzoyl)phosphine oxide, ethyl (2,4,6-trimethylbenzoyl)phenylphosphinate, and combinations thereof.

10. The ultraviolet light curable resin composition as defined in claim 7, wherein:

the initiator is the brominated aromatic acrylate; and the brominated aromatic acrylate is pentabromobenzyl acrylate.

11. The ultraviolet light curable resin composition as defined in claim 7, wherein:

the initiator is the dithiocarbamate; and the dithiocarbamate is benzyl diethyldithiocarbamate.

* * * * *